(12) United States Patent
Sunada

(10) Patent No.: US 7,630,985 B2
(45) Date of Patent: Dec. 8, 2009

(54) DATA SERVER, DATA MANAGEMENT METHOD, AND DATA MANAGEMENT SYSTEM

(75) Inventor: Akira Sunada, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 613 days.

(21) Appl. No.: 11/333,060

(22) Filed: Jan. 17, 2006

(65) Prior Publication Data

US 2007/0055674 A1 Mar. 8, 2007

(30) Foreign Application Priority Data

Sep. 2, 2005 (JP) ............................. 2005-255521

(51) Int. Cl.
*G06F 17/30* (2006.01)

(52) U.S. Cl. ..................... 707/9; 707/1; 707/3; 707/10; 707/100; 709/203; 709/223; 709/226

(58) Field of Classification Search ...................... 707/1, 707/3, 9, 10, 100; 709/203, 217–219, 223–226
See application file for complete search history.

(56) References Cited

U.S. PATENT DOCUMENTS

| 5,513,314 | A | * | 4/1996 | Kandasamy et al. ............ 714/6 |
| 5,542,087 | A | * | 7/1996 | Neimat et al. .................. 707/10 |
| 5,930,801 | A | * | 7/1999 | Falkenhainer et al. ..... 707/103 R |
| 5,940,289 | A | * | 8/1999 | Iwata et al. ..................... 700/2 |
| 6,178,418 | B1 | * | 1/2001 | Singer ........................... 707/3 |
| 6,195,680 | B1 | * | 2/2001 | Goldszmidt et al. ......... 709/203 |
| 6,374,241 | B1 | * | 4/2002 | Lamburt et al. ................ 707/6 |
| 6,587,880 | B1 | * | 7/2003 | Saigo et al. .................. 709/225 |

(Continued)

FOREIGN PATENT DOCUMENTS

JP 11003265 1/1999

(Continued)

OTHER PUBLICATIONS

"Creating a GIS Data Server on the World Wide Web: The GISST Example"—Peter J. Pace & Thomas K. Evers—Jan. 1, 1996, (pp. 1-12).*

(Continued)

*Primary Examiner*—Jean B. Fleurantin
*Assistant Examiner*—Anh Ly
(74) *Attorney, Agent, or Firm*—Gauthier & Connors LLP

(57) ABSTRACT

A data server which partially constitutes a data management system in cooperation with another data server connected via a network, the data server having: a data management section that stores a data item; a user authentication section that performs user authentication; a searching section that searches the data management section for a requested data item when a data request is received from a client; a data providing section that provides the requested data item to the client when the requested data item is found in the data management section; and a redirect section that, when the requested data item is not found in the data management section, detects a data server which stores the requested data item in the data management system, receives temporary authentication information from the data server, and sends information to identify the requested data item in the data server and the temporary authentication information to the client.

13 Claims, 17 Drawing Sheets

U.S. PATENT DOCUMENTS

| | | | |
|---|---|---|---|
| 6,594,651 B2 * | 7/2003 | Kabra et al. | 707/2 |
| 6,668,288 B1 * | 12/2003 | Midwinter et al. | 710/29 |
| 6,895,394 B1 * | 5/2005 | Kremer et al. | 705/67 |
| 7,191,467 B1 * | 3/2007 | Dujari et al. | 726/5 |
| 7,206,301 B2 * | 4/2007 | Wu et al. | 370/338 |
| 7,231,661 B1 * | 6/2007 | Villavicencio et al. | 726/4 |
| 7,293,099 B1 * | 11/2007 | Kalajan | 709/230 |
| 2001/0027467 A1 * | 10/2001 | Anderson et al. | 709/201 |
| 2002/0087559 A1 * | 7/2002 | Pratt | 707/100 |
| 2003/0149900 A1 * | 8/2003 | Glassman et al. | 713/202 |
| 2003/0233328 A1 * | 12/2003 | Scott et al. | 705/50 |
| 2004/0030755 A1 * | 2/2004 | Koning et al. | 709/217 |
| 2004/0107272 A1 * | 6/2004 | Manukyan | 709/221 |
| 2005/0034166 A1 * | 2/2005 | Kim et al. | 725/119 |
| 2005/0122941 A1 * | 6/2005 | Wu et al. | 370/338 |
| 2006/0047780 A1 * | 3/2006 | Patnude | 709/219 |
| 2006/0185021 A1 * | 8/2006 | Dujari et al. | 726/27 |
| 2006/0265392 A1 * | 11/2006 | Sunada et al. | 707/10 |
| 2006/0277196 A1 * | 12/2006 | Oosawa et al. | 707/10 |
| 2007/0130400 A1 * | 6/2007 | Reisman | 710/62 |
| 2007/0174905 A1 * | 7/2007 | Martherus et al. | 726/8 |

FOREIGN PATENT DOCUMENTS

JP   2002324051   11/2002

OTHER PUBLICATIONS

"DSpace System Documentation"—Tansley et al. (for DSpace Version: 1.3.2 (Oct. 5, 2005—copyright 2002-2005 MIT and Hewlett Packard (pp. 1-16).*

LH—A Scalable, Distributed data Structure—Witold Litwin, Marie-Anne Neimat, and Donovan A. Schneider—Hewlett-Packard labs, Polo Alto—ACM Transactions on database Systems, vol. 21, No. 4, Dec. 1996 (pp. 480-525).*

"Trusted Identify and Session Management Using Secure Cookies"—Joon S. Park and Harish S. Krishnan—SpringerLink vol. 3654/2005 (Aug. 4, 2005) (pp. 310-324).*

Interworking architecture between 3GPP and WLAN systems—Ahmavaara, Henry Haverinen and Roman Pichna—Nokia Corp., Finland—vol. 41, issue: 11, Nov. 2003 (pp. 74-81).*

* cited by examiner

| DATA ID(UUID) | LINK INFORMATION TO ACTUAL DATA ITEM |
|---|---|
| fc77e817-da45-470c-9bdc-aed61ec5f3cd | c:/data/data1 |
| aca622ce-8793-42eb-a0cb-cae8f7659ebb | c:/data/data2 |
| ⋮ | ⋮ |

110 http://foo.fx.co.jp/get/12345....67890

| USER ID (UUID) 202 | LAST NAME 204 | FIRST NAME 206 | AUTHEN-TICATION INFOR-MATION 208 | ... |
|---|---|---|---|---|
| c08263a7-d721-403d-9196-09c73598267d | FUJI | TARO | ****** | ... |
| 5c12e675-46d7-400e-8a72-a45934d83b5f | FUJI | HANAKO | ****** | ... |
| ⋮ | ⋮ | ⋮ | ⋮ | ⋮ |

Fig. 10

| USER ID (UUID) 222 | ACCESS RIGHT DATA (USER ID:ACCESS RIGHT) 224 |
|---|---|
| fc77e817-da45-470c-9bdc-aed61ec5f3cd | c08263a7-d721-403d-9196-09c73598267d : RM |
| | 5c12e675-46d7-400e-8a72-a45934d83b5f : RW |
| aca622ce-8793-42eb-a0cb-cae8f7659ebb | c08263a7-d721-403d-9196-09c73598267d : R |
| ⋮ | ⋮ |

Fig. 11

| TEMPORARY ID (242) | USER ID (UUID) (244) | EXPIRATION TIME (246) |
|---|---|---|
| 01001 | c08263a7-d721-403d-9196-09c73598267d | 13:24:22 |
| 01002 | 5c12e675-46d7-400e-8a72-a45934d83b5f | 13:25:36 |
| ⋮ | ⋮ | ⋮ |

Fig. 12

| SERVER A (SELF) | SERVER B | SERVER C | ..... |
|---|---|---|---|
| USER 1 | USER A | — | ..... |
| USER 2 | USER B | USER $\alpha$ | ..... |
| — | USER C | USER $\beta$ | ..... |
| ⋮ | ⋮ | ⋮ | ..... |

Fig. 19

DATA SERVER, DATA MANAGEMENT METHOD, AND DATA MANAGEMENT SYSTEM

PRIORITY INFORMATION

This application claims priority to Japanese Patent Application No. 2005-255521, filed on Sep. 2, 2005, which is incorporated herein by reference in its entirety.

BACKGROUND OF THE INVENTION

1. Field of the Invention

The present invention relates to a technique for allowing a user to obtain a data item even when the data item is moved from a server to another server and the user requests the original server to provide the data item, and particularly to transfer of user authentication with respect to a server.

2. Description of the Related Art

Conventionally, the following technique is available in this field. A data management system manages files by attaching to each file a unique identifier called a "handle." The data management system provides to a user, as a URL (Uniform Resource Locator) of a file, not a URL showing the location (combination of a located server and a path name of the file within the server) of the file, which conventionally is commonly employed, but a virtual URL designating the server name of the system and the handle of the file. When the user accesses the system using the virtual URL, the system identifies the location of the file from the handle and provides the file to the user. With this technique, even when the file is moved to an arbitrary location (directory) on the data management system, the file can be found in response to a request from a user.

This technique, however, is limited to resolving a location of a file or content managed within one data management system, and, for example, cannot handle a case in which the location of the file or the content is moved among multiple data management systems on a network.

As a method for allowing a user to obtain the file or the content by finding the location of the file or the content even when a file or a content has been moved among multiple data management servers, there may be considered a method in which a URL of the movement destination is registered in the server from which the data item has been moved and the server redirects a request to the URL of the movement destination when the user requests the movement origin server to provide the data item (HTTP redirect). This method, however, involves a problem in the user authentication of each data management server. More specifically, even when the user requests the data movement origin server to provide the data item with successful user authentication completed, when the request is redirected, in view that the user is not authenticated at the movement destination server, the request may be rejected. Even if this is not the case, the user must be authenticated again at the movement destination, which poses inconvenience to the user.

As a technique for transferring the user authentication among multiple devices, the following method is available. Specifically, a server which manages login states is provided, and the login states of users are controlled in a centralized manner. Each application transmits an inquiry to the central server when the user accesses the application, so that the login state is transferred among applications.

This related-art method requires provision of a server in order to manage the login states, and involves a problem in that the system cannot function when a problem occurs in the server.

SUMMARY OF THE INVENTION

According to one aspect of the present invention, there is provided a data server which partially constitutes a data management system in cooperation with another data server connected via a network, the data server having: a data management section that stores a data item; a user authentication section that performs user authentication; a searching section that searches the data management section for a requested data item when a data request is received from a client; a data providing section that provides the requested data item to the client when the requested data item is found in the data management section; and a redirect section that, when the requested data item is not found in the data management section, detects a data server which stores the requested data item in the data management system, receives temporary authentication information from the data server, and sends information to identify the requested data item in the data server and the temporary authentication information to the client.

According to another aspect of the present invention, there is provided a data server which partially constitutes a data management system in cooperation with another data server connected via a network, the data server having: a user authentication section that performs user authentication; a searching section that searches the data management section for a requested data item when a data request is received from a client; a data providing section that provides the requested data item to the client when requested data item is found in the data management section; and an inquiry responding section that searches the data management section when receiving an inquiry on presence of a requested data item from other data server in the data management system, and, when the requested data item is found, creates temporary authentication information, stores the temporary authentication information in a temporary authentication information storage section, and notifies the other data server of the temporary authentication information.

According to another aspect of the present invention, there is provided a first data server which partially constitutes a data management system in cooperation with another data server connected via a network, the first data server sing: a data management section that stores a data item; a user authentication section that performs user authentication; a searching section that searches the data management section for a requested data item when a data request is received from a user; a data providing section that provides the requested data item to the client when the requested data item is found in the data management section; and a redirect section that, when the requested data item is not found in the data management section, detects a second data server which stores the requested data item in the data management system, generates temporary authentication information for the requested data item, generates redirect information including information to identify the requested data item in the second data server, the temporary authentication information for the requested data item, and server identification information of the first data server, and returns the redirect information to the client.

According to another aspect of the present invention, there is provided a second data server which partially constitutes a data management system in cooperation with another data server connected via a network, the second data server having: a data management section that stores a data item; a user authentication section that performs user authentication; a searching section that searches the data management section for a requested data item when a data request is received from a user; a data providing section that provides the requested data item to the client when the requested data item is found in the data management section; a redirect authentication section that, when a data request is received from a client for which the user authentication has not been completed, transmits an inquiry on validity of temporary authentication information retrieved from the data request to a first data server indicated by server identification information retrieved from the data request, and accepts the data request without causing the client to perform a process for user authentication when a response to the inquiry indicating that the temporary authentication information is valid is received.

According to another aspect of the present invention, there is provided a data management method executed by a data server which partially constitutes a data management system in cooperation with another data server connected via a network, the method having: searching the data server for a requested data item in a data request when the data request is received from a client which is successfully authenticated; providing the requested data item when the requested data item is found; identifying a data server having the requested data item as a transfer destination server by transmitting an inquiry on presence of the requested data item to another data server when the requested data item is not found; receiving temporary authentication information from the transfer destination server; and returning to the client redirect information including access information which identifies the requested data item in the transfer destination server and the temporary authentication information.

According to another aspect of the present invention, there is provided a data management method executed by a data server which partially constitutes a data management system in cooperation with another data server connected via a network, the method having: searching the data server for a requested data item of a data request when the data request is received from a user who is successfully authenticated; providing the requested data item to the client when the requested data item is found; identifying a data server having the requested data item as a transfer destination server by transmitting an inquiry on presence of the requested data item to another data server when the requested data item is not found; creating temporary authentication information for the requested data item; and creating redirect information including access information for identifying the requested data item in the transfer destination server, the temporary authentication information for the requested data item, and server identification information of the data server, and returning the redirect information to the client.

According to another aspect of the present invention, there is provided a data management system having: a data management section that stores a data item; a user authentication section that performs user authentication; a searching section that searches the data management section for a requested data item when a data request is received from a client; a data providing section that provides the requested data item to the client when the requested data item is found in the data management section; a redirect section that, when the requested data item is not found in the data management section, detects a data server which stores the requested data item in the data management system, receives temporary authentication information from the data server, and sends information to identify the requested data item in the data server and the temporary authentication information to the client; and an inquiry responding section that searches the data management section when receiving an inquiry on presence of a requested data item from other data server in the data management system, and, when the requested data item is found, creates temporary authentication information, stores the temporary authentication information in a temporary authentication information storage section, and notifies the other data server of the temporary authentication information.

BRIEF DESCRIPTION OF THE DRAWINGS

These and other aspects of the disclosure will become apparent from the following description when read in conjunction with the accompanying drawings, wherein the same reference numerals have been applied to like elements and in which:

FIG. 2 is a diagram showing a structure of management information of a data item in a data management section;

FIG. 3 is a diagram exemplifying a virtual URL;

FIG. 10 is a diagram showing an example data content of user information managed by a user information management section;

FIG. 11 is a diagram showing an example data content of access right information managed by an access right management section;

FIG. 12 is a diagram showing a data content managed by a temporary ID storage section;

FIG. 19 is a diagram showing an example of mapping information of a user ID.

DETAILED DESCRIPTION OF THE INVENTION

Figure 1:
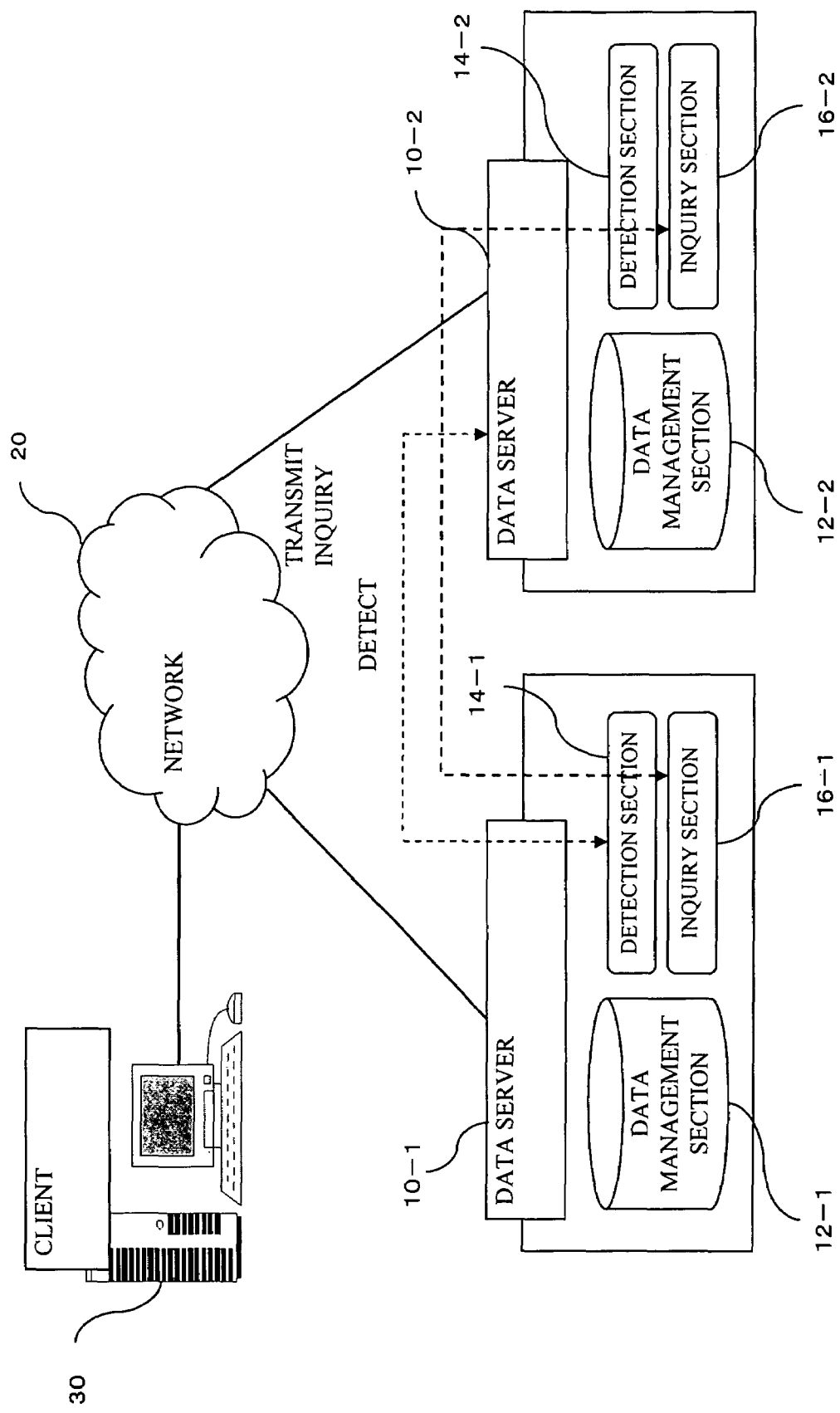
FIG. 1 is a diagram showing a data management system.

FIG. 1 is a diagram schematically showing the structure of an example data management system. As shown in FIG. 1, the system includes multiple data servers 10-1, 10-2, . . . which are connected to a network 20 such as a LAN (Local Area Network) or the Internet (hereinafter, simply referred to as "data servers 10" unless the data servers must be distinguished; the same applies to modules within the data servers 10). The system provides a requested data item in response to a data request from a client 30 on the network 20.

Each data server 10 includes a data management section 12, a detection section 14, and an inquiry section 16. In the data management section 12, one or more data items are stored and can be provided to the client 30 (hereinafter, data items may be referred to as simply "data"). The data management section 12 manages each of the stored data items in correspondence to a globally unique data ID (identifier). For example, the globally unique data ID may be an identifier of 128 bits known as a UUID (Universally Unique IDentifier) or a GUID (Globally Unique IDentifier). The UUID includes the time of creation of the UUID, a MAC (Media Access Control) address of a network card provided in a machine used for creation of the UUID, etc. for assuring global uniqueness. The URL uniquely indicates a data item using a host name of the data server 10 having the data item and the path name indicating the location at which the data item is actually stored in the data server 10, while the data ID of the system is an identifier independent from the information of the location of data item.

FIG. 2 shows a data structure of management information of each data item managed by the data management section 12. As shown in FIG. 2, the data management section 12 manages each stored data item by correlating a data ID 102 of the data item and link information 104 which indicates the location of the data item within the data server 10. In this example structure, the data ID is represented by a UUID and the link information is represented by a path name of the data item.

When a new data item is to be stored, the data management section 12 creates a globally unique data ID and manages the data item by correlating the data ID with the link information indicating the stored location of the data item. When a managed data item is deleted from the data server 10, the data management section 12 also deletes the management information of the deleted data item.

When a data item to which a data ID is already attached is to be stored in the data management section 12 (for example, when a data item managed by a data server is moved to another data server), the data management section 12 does not attach a new data ID to the data item, and manages the data item by correlating the link information of the data item with the data ID which is already attached.

The detection section 14 is a unit which detects another data server 10 present on the network 20.

The inquiry section 16 is a unit which transmits an inquiry to another data server 10 as to whether or not the other data server 10 has the data item requested by the client 30. The inquiry section 16 also has a function of responding to an inquiry from an inquiry section 16 of another data server 10.

In this system, when the client 30 requests a data item from the system, the client 30 designates the data item by means of a virtual URL 110 including a host name 112 of the data server 10 which manages the data item, and a data ID 114 of the data item, as shown in FIG. 3. Because the virtual URL 110 is a URL, the virtual URL 110 includes information on protocol, port, etc., but these aspects are not described here. Because the number of digits of the globally unique data ID is much greater than the number of digits of the data ID 114 exemplified in FIG. 3, a portion of the data ID is omitted in FIG. 3. The virtual URL shown in FIG. 3 indicates a data item managed by a data server called "foo.fx.co.jp" and having a data ID of "12345 . . . 67890." In the virtual URL of FIG. 3, the term "get" between the host name 112 and the data ID 114 indicates the name of a method provided by the data server 10. When the data server 10 allows the client 30 to perform multiple types of operations in relation to the data item managed by the data server 10, the virtual URL is configured to include the method indicating the operation. When, on the other hand, the data server 10 simply provides the requested data item to the client 30, inclusion of such a description of a method is not necessary.

When the client 30 (for example, a web browser) requests a data item by means of the virtual URL 110, data request information including the data ID 114 is transmitted to a server indicated by the host name 112.

Next, processing performed when the data server 10 receives data request information from the client 30 will be explained by reference to FIG. 4. In the following description, for the sake of convenience the processing is explained as processing performed by the data server 10-1, but processing performed by the other data servers is similar to that described.

In this processing, the data server 10-1 retrieves the data ID from the data request information from the client 30 (S100) and searches the data management section 12-1 for link information of the actual data item corresponding to the data ID (S102). When the link information corresponding to the data ID is found (when the determination result in step S104 is YES (Y)), the data server 10-1 obtains the actual data item indicated by the link information from the storage device within the data server 10-1 and provides the obtained data item to the client 30 (S114).

When, on the other hand, the link information corresponding to the data ID is not found (when the determination result in step S104 is NO (N)), the data server 10-1 instructs the detection section 14-1 to detect other data servers 10-2, etc. partially constituting the present system, and in response to the instruction, the detection section 14-1 detects other data servers (S106). Detection of the other data servers 10-2, etc. by the detection section 14-1 can be achieved by, for example, the detection section 14-1 broadcasting to the network 20 a predetermined message for detecting other servers. The detection section 14 of each data server 10 has a protocol for recognizing the message for detecting other servers and responding to the message. In other words, the detection section 14-2 of another data server 10-2 receiving the message for detecting other servers transmits a response including a server ID (identifier) of the data server 10-2 according to the protocol. For example, an IP address or a host name may be used as the server ID. The detection section 14-1 which has transmitted the message for detecting other servers receives the response from the data server 10-2 and obtains the server ID included in the response. In this manner, another data server 10-2 which partially constitutes the present system can be found.

When the other data server 10-2 is found, the data server 10-1 instructs the inquiry section 16-1 to transmit an inquiry to the found data server 10-2. In response to this instruction, the inquiry section 16-1 transmits to the data server 10-2 a data inquiry including the data identifier included in the data request from the client 30 and inquires as to whether or not the data server 10-2 has the data item corresponding to the data identifier (S108). An operation performed by the inquiry section 16-2 of the data server 10-2 receiving this inquiry will be described later.

When the result of inquiry shows that the data server 10-2 to which the inquiry has been transmitted does not have the data item (when the determination result of step S110 is NO (N)), the data server 10-1 repeats detection of another data server (S106) and transmission of inquiry (S108). Steps S106 and S108 are repeated until a data server 10 having the data item is found.

Figure 4:
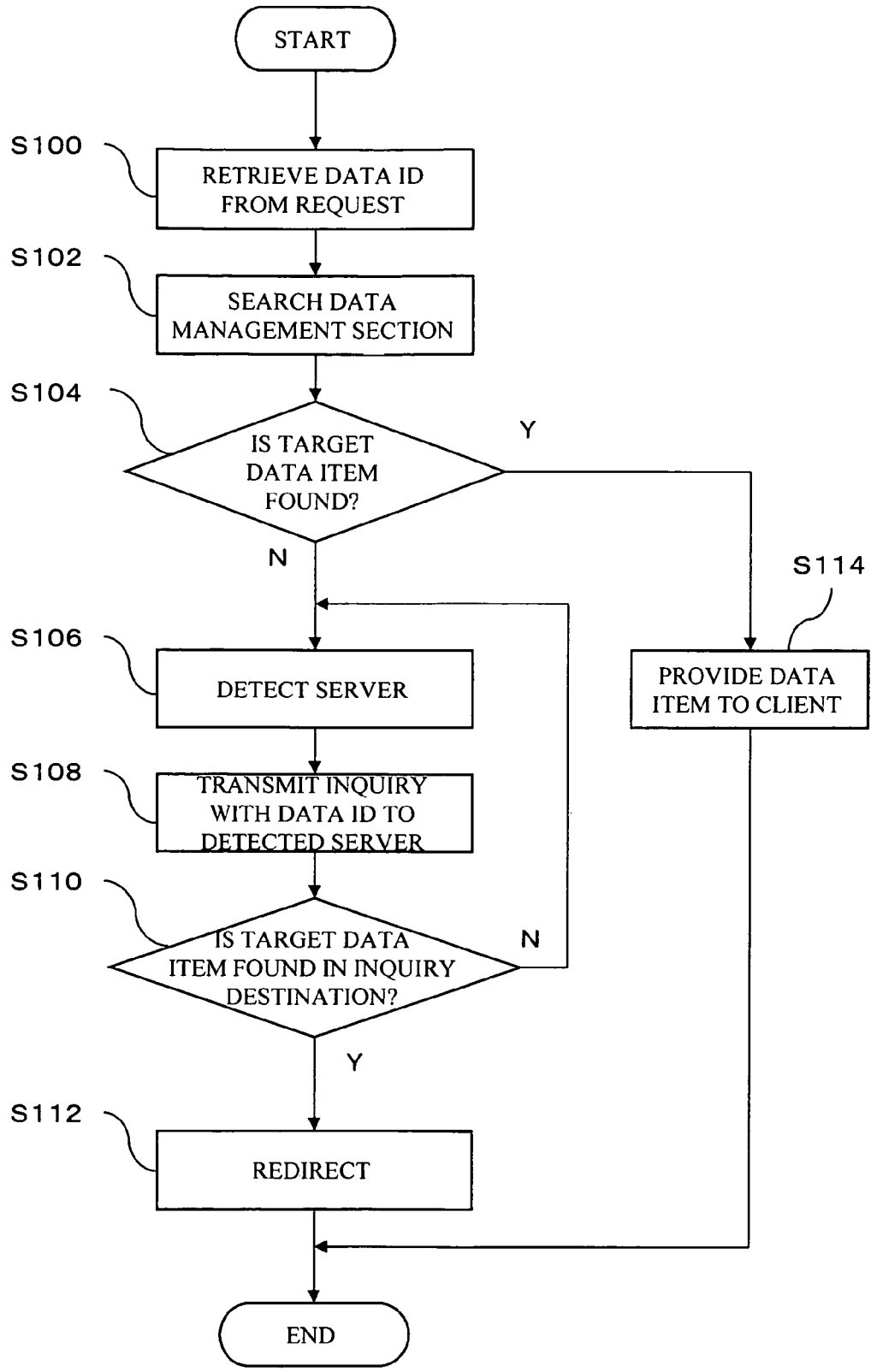
FIG. 4 is a flowchart showing processing performed by a data server when receiving data request information from a client.

Although FIG. 4 shows a procedure in which one data server is detected in step S106 and an inquiry is transmitted to the data server in step S108, the present invention is not limited to such a configuration, and it is also possible, for example, to detect all data servers 10 which can be detected through broadcasting in step S106, store the found data servers 10, and sequentially transmit the inquiry to each data server 10 in step S108.

When the result of inquiry shows that the data server 10-2 to which the inquiry has been transmitted has the data item (when the determination result in step S110 is YES (Y)), the data server 10-1 returns to the client 30 redirect information including the server ID of the data server 10-2 (S112). The return of the redirect information can be achieved, for example, according to a general redirect method of HTTP (HyperText Transfer Protocol). That is, the data server 10-1 returns to the client 30 redirect information including a status code indicating redirect, such as 302 (moved temporarily), and a location field including the URL of the redirect destination. The URL of the redirect destination included in the redirect information is the above-described virtual URL including the server ID of the data server 10-2 which is the redirect destination and the data identifier of the requested data item. Because the server ID of the redirect destination is already known during transmission of the inquiry, and the data identifier of the requested data item is also known, the data server 10-1 can create the virtual URL including these pieces of information.

The client 30 receiving the redirect information transmits a data request including the data identifier within the redirect information to the data server 10-2 indicated in the server ID in the redirect information according to HTTP.

Figure 5:
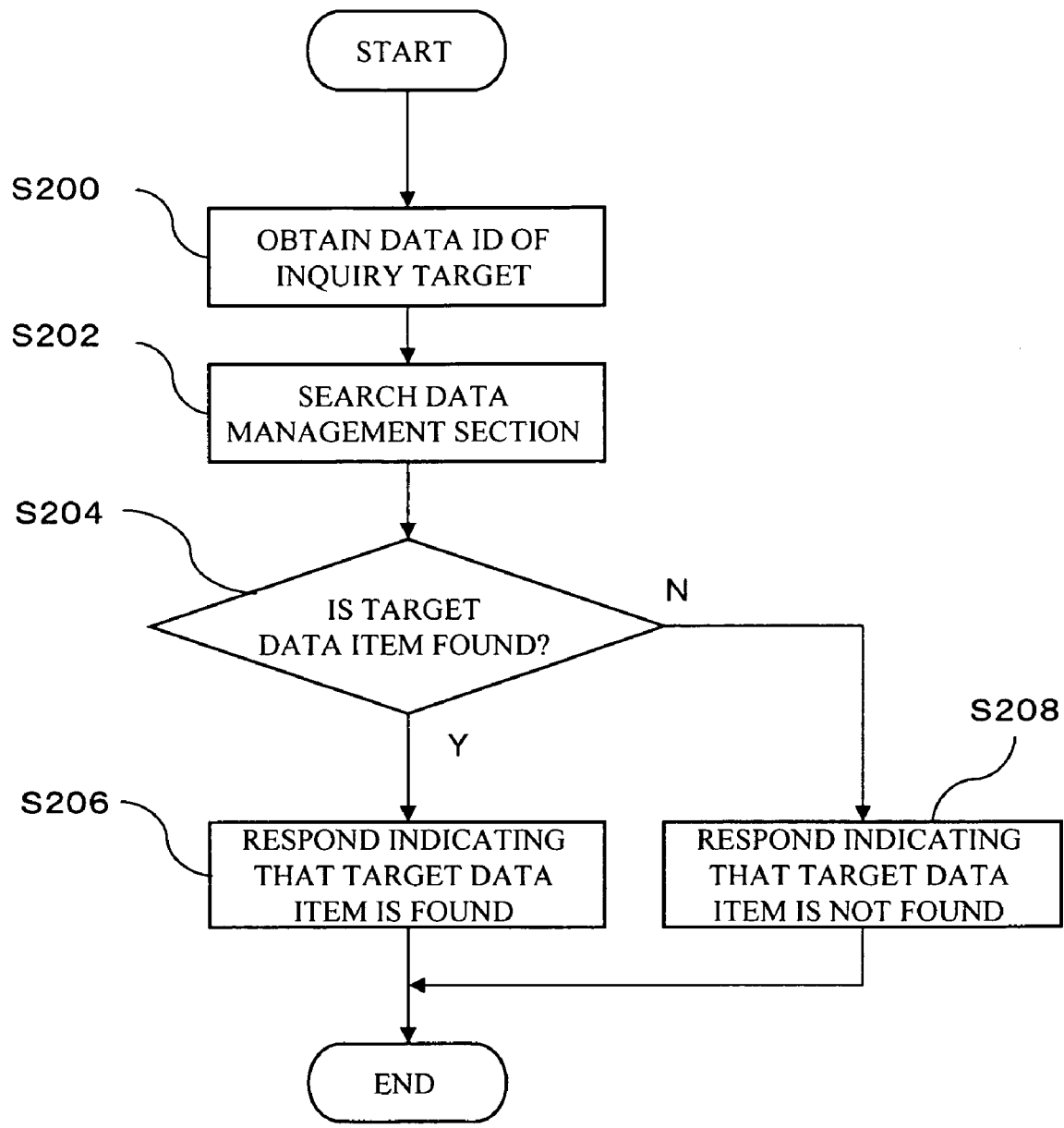
FIG. 5 is a flowchart showing processing performed by the data server when receiving an inquiry from another data server.

Next, processing performed by a data server when the data server receives an inquiry from another data server will be described by reference to FIG. 5. In the following description, for the sake of convenience the processing is described as processing performed by the data server 10-2, but the other data servers perform similar processing.

When the inquiry section 16-2 of the data server 10-2 receives a data inquiry from the inquiry section 16-1 of the data server 10-1, the inquiry section 16-2 retrieves the data ID of the target data item from the information of the data inquiry (S200) and searches the data management section 12-2 for link information corresponding to the data ID (S202). When, as a result of the search, the link information corresponding to the data ID is found in the data management section 12-2 (when the determination result of step S204 is YES (Y)), the inquiry section 16-2 returns to the data server 10-1 which has transmitted the inquiry a message indicating that the data server 10-2 has the data item which is the target of the inquiry (S206). When, on the other hand, the link information is not found (when the determination result in step S204 is NO (N)), the inquiry section 16-2 returns to the data server 10-1 a message indicating that the data server 10-2 does not have the data item which is the inquiry target (S208).

Alternatively, in step S206, instead of returning to the inquiry origin a message that the data item which is the inquiry target is present, the inquiry section 16-2 can return the virtual URL of the data item which is the inquiry target (that is, the virtual URL including the server ID of the data server 10-2 having the data item and the data identifier of the data item). In this configuration, in step S112, the data server 10-1 which has transmitted the inquiry may return to the client 30 the virtual URL provided by the data server 10-2.

An operation of the data management system as described above will now be described by reference to FIGS. 6-8.

Figure 6:
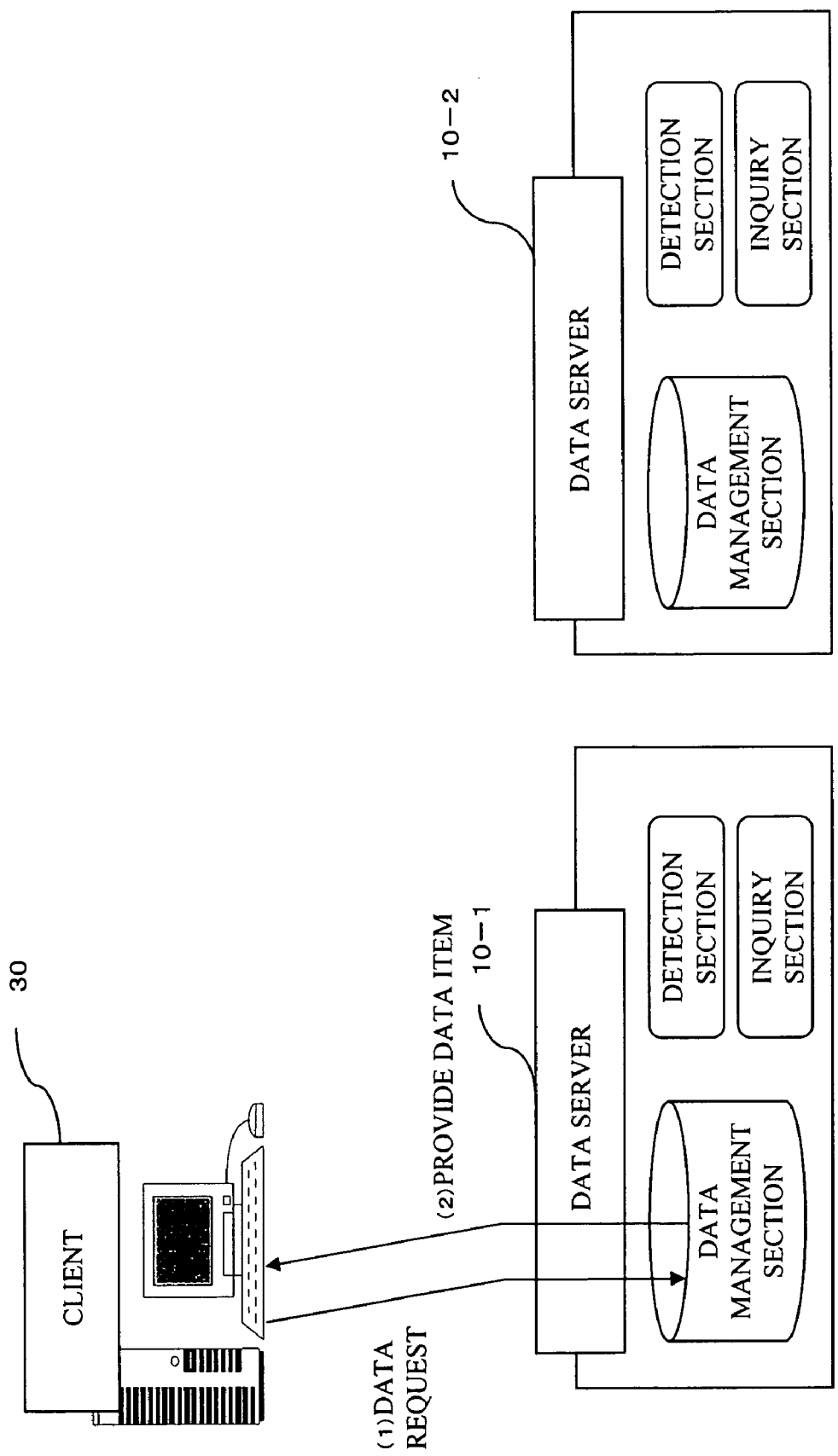
FIG. 6 is a diagram for explaining an operation of the system of FIG. 1.

As shown in FIG. 6, when the data server 10-1 has the target data item of the data request (1) transmitted from the client 30 to the data server 10-1, the data server 10-1 provides the target data item to the client 30 (2).

Figure 7:
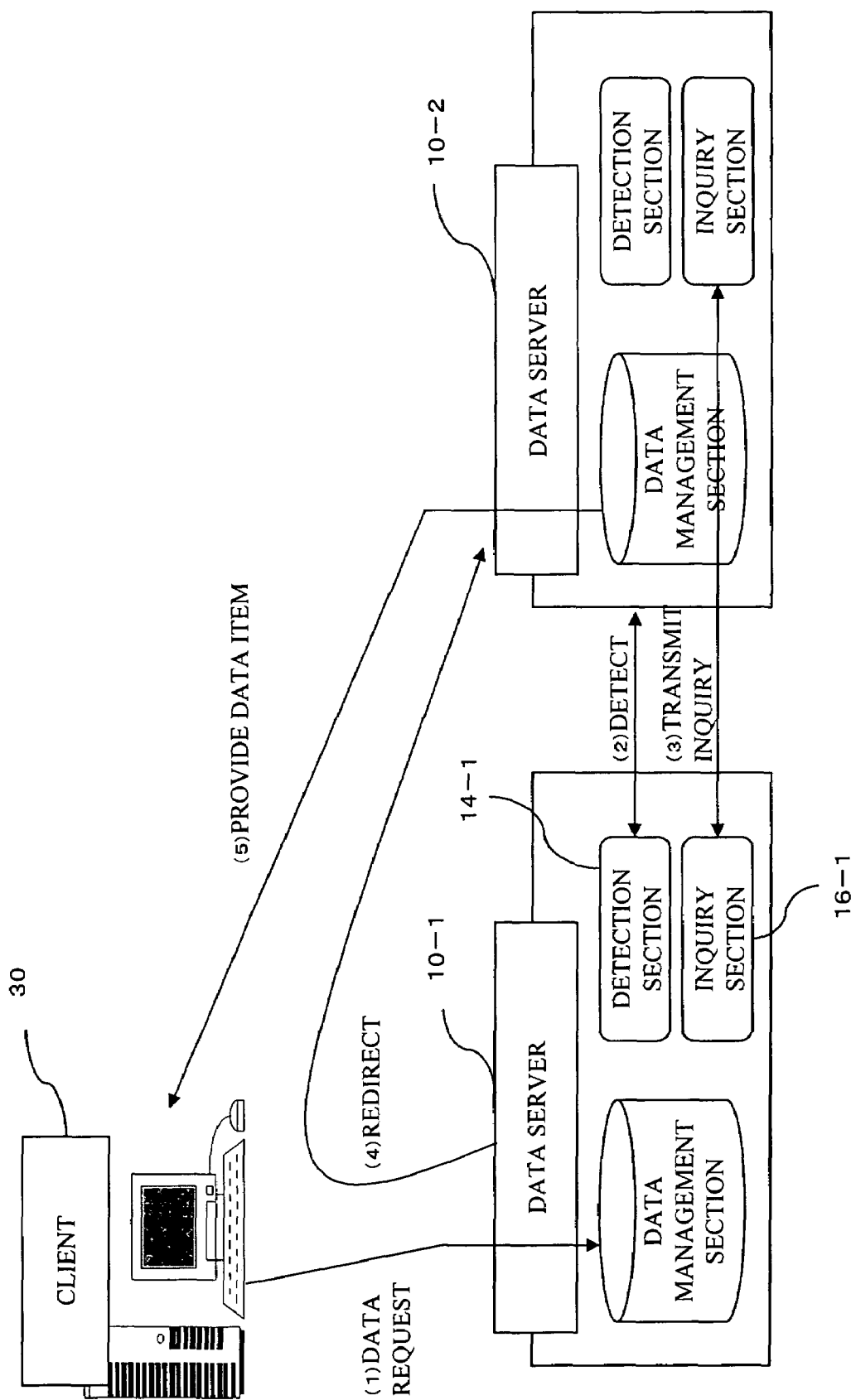
FIG. 7 is a diagram for explaining an operation of the system of FIG. 1.

When, on the other hand, the target data item of the data request (1) transmitted from the client 30 to the data server 10-1 is not present in the data server 10-1 as shown in FIG. 7, the detection section 14-1 detects another data server 10-2 (2) and transmits a data inquiry to the data server 10-2 (3). When the result of inquiry shows that the data server 10-2 has the requested data item, the data server 10-1 redirects the data request from the client 30 to the data server 10-2 (4). In response to the redirected data request, the data server 10-2 provides the requested data item to the client 30 (5).

Figure 8:
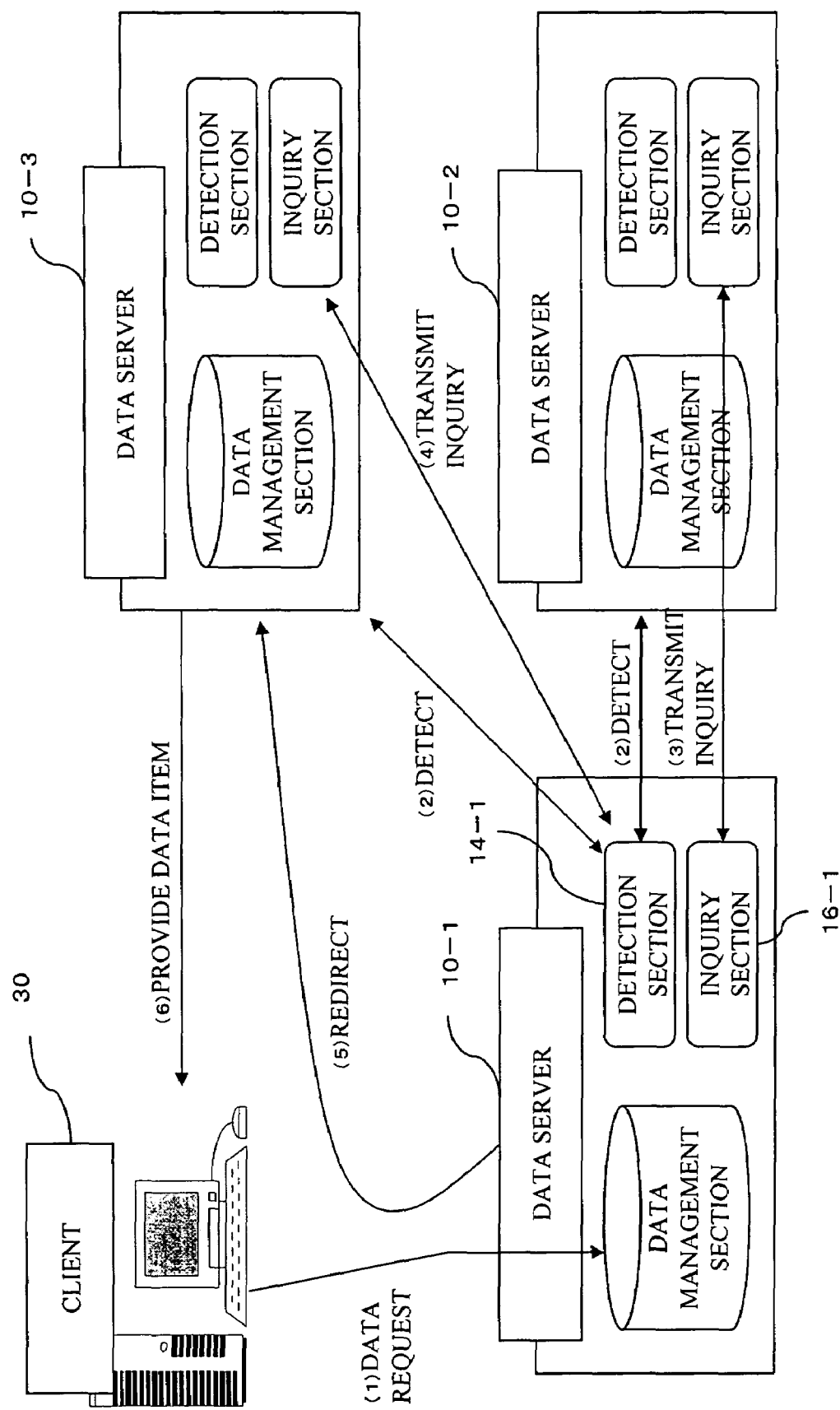
FIG. 8 is a diagram for explaining an operation of the system of FIG. 1.

FIG. 8 shows a situation in which the data item requested by the client 30 is present in neither the data server 10-1 nor the data server 10-2, but is present in a data server 10-3. In this case (2), of the data servers 10-2 and 10-3 detected by the detection section 14-1, the inquiry section 16-1 first transmits an inquiry to the server 10-2 and receives a response that the data server 10-2 does not have the data item (3). Then, the inquiry section 16-1 transmits the inquiry to the next data server 10-3 and receives a response that the data server 10-3 has the data item (4). The data server 10-1 redirects the data request from the client 30 to the data server 10-3 (5). In response to the redirected data request, the data server 10-3 provides the requested data item to the client 30 (6).

As described, in the present system, each data server 10 searches for a data server 10 having the data item requested by the client 30 and redirects the request to the found data server 10. Therefore, because the requested data item can be found even when no central management server is provided, a problem that the data cannot be resolved due to failure of a server can be significantly inhibited as compared with the related art.

In this system, even when the location of the data item changes as a result of the data item being moved between data servers 10, the client 30 can access the data item using the existing virtual URL, so that the data server 10 which originally managed the data item; that is, the data server 10 corresponding to the server ID within the virtual URL, receives the access request and searches for a data server 10 which currently has the data item. Therefore, the client 30 can obtain the data item using the virtual URL which the client 30 already has.

Some known data servers have a function of, for example, distributing to the user via an electronic mail a URL which can check a change occurring when the data items on the server change, such as when a data item is newly stored. When, however, the data item on the server is moved to another server, the distributed URL becomes unusable. When the mechanism of the present system is employed, however, even in such a situation, the client can obtain the data item using the virtual URL distributed before the data movement. In addition, commonly, a data server 10 must be divided because of an increase in the amount of data to be managed. In such a situation also, according to the system, the virtual URL distributed among the users before the division can be used after the division.

An embodiment will now be described in which a transfer method of user authentication according to the present invention is applied to the data management system described above.

Figure 9:
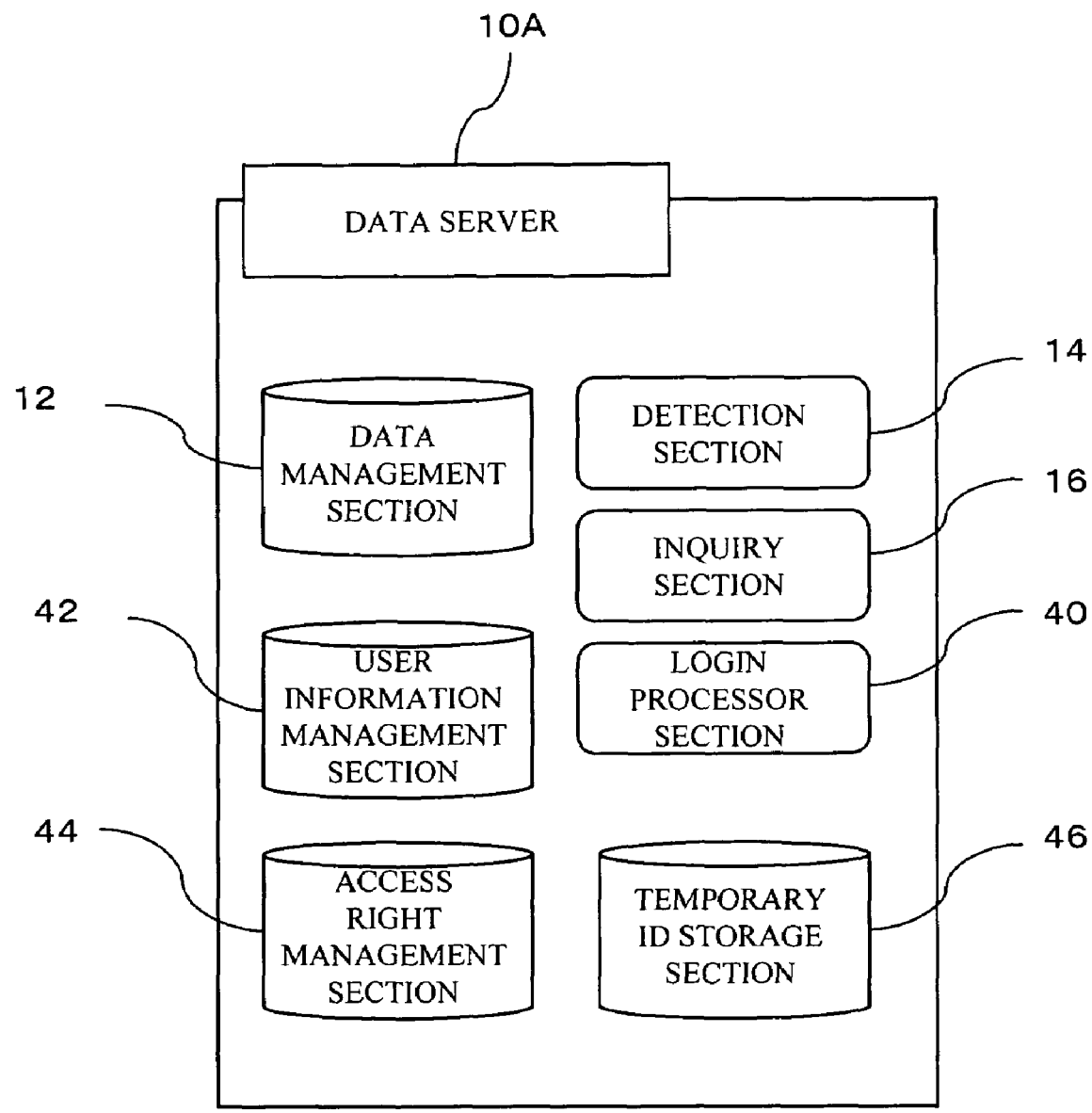
FIG. 9 is a diagram showing an example structure of a data server which uses the mechanism of user authentication transfer.

FIG. 9 is a functional block diagram of a data server 10A in the embodiment. In FIG. 9, elements that are similar to those shown in FIG. 1 are assigned the same reference numerals and will not be described again.

In the embodiment, each data server 10A includes, in addition to the data management section 12, the detection section 14 and the inquiry section 16 which are included in the data server 10 exemplified in FIG. 1, a login processor section 40, a user information management section 42, an access right management section 44, and a temporary ID storage section 46. Similar to the system shown in FIG. 1, the data management system of the embodiment is constituted of multiple data servers 10A having such a structure and cooperating with each other via a network.

The login processor section 40 manages login processes of users onto the data server 10A.

The user information management section 42 manages user registration information in relation to the data server 10A. FIG. 10 shows an example data content of user information registered in the user information management section 42. In the example configuration of FIG. 10, personal information such as a last name 204 of the user, a first name 206 of the user, authentication information 208 such as a password, etc. are stored in correspondence to a user ID 202 for each user. Other examples of the personal information may include, for example, the electronic mail address of the user and the title of the user. In the exemplified configuration, because a UUID is used as the user ID 202, the user can be identified by using the user ID which is unified for all data servers 10A constituting the data management system. The collection of the users registered in the user information management section 42 does not need to match among all data servers 10A. It is sufficient that each data server 10A individually registers the users in the user information management section 42. When a user having no registered user ID accesses the system, the login processor section 40 applies a control to prohibit login of that user or to allow login as a user having a "guest" right which is limited in the types of operations.

The access right management section 44 manages information on the access right of each user in relation to each data item stored in the data management section 12. FIG. 11 shows an example data content managed by the access right management section 44. In this example configuration, access right information 224 in relation to a data item is registered for each data ID 222 (UUID) corresponding to each data item. The access right information 224 includes the user ID of each user granted an access right for the data item corresponding to the data ID 222, along with the content of the access right granted to the user. The content of the access right is indicated as a combination of individual rights such as R (a right to read), W (a right to write), and M (a right to manage data). For example, "RW" would mean that the user has the rights to read and write. The types of the access rights described here are exemplary, and the types are not limited to those described above. The administrator of the data server 10A, for example, registers the access right information to the access right management section 44.

The temporary ID storage section 46 stores and manages a temporary ID, which is an identifier assigned to a user indicating temporary access permission to individual data items. FIG. 12 shows example data content stored and managed by the temporary ID storage section 46. In this example configuration, for each temporary ID 242, a user ID 244 of a user granted the temporary access right and an expiration time 246 of the temporary ID 242 are stored.

An overall flow of the processes in the system of the embodiment will now be described with reference to FIG. 13. Each of data servers 10A-1 and 10A-2 shown in FIG. 13 assumes the form of the data server 10A shown in FIG. 9.

Figure 13:
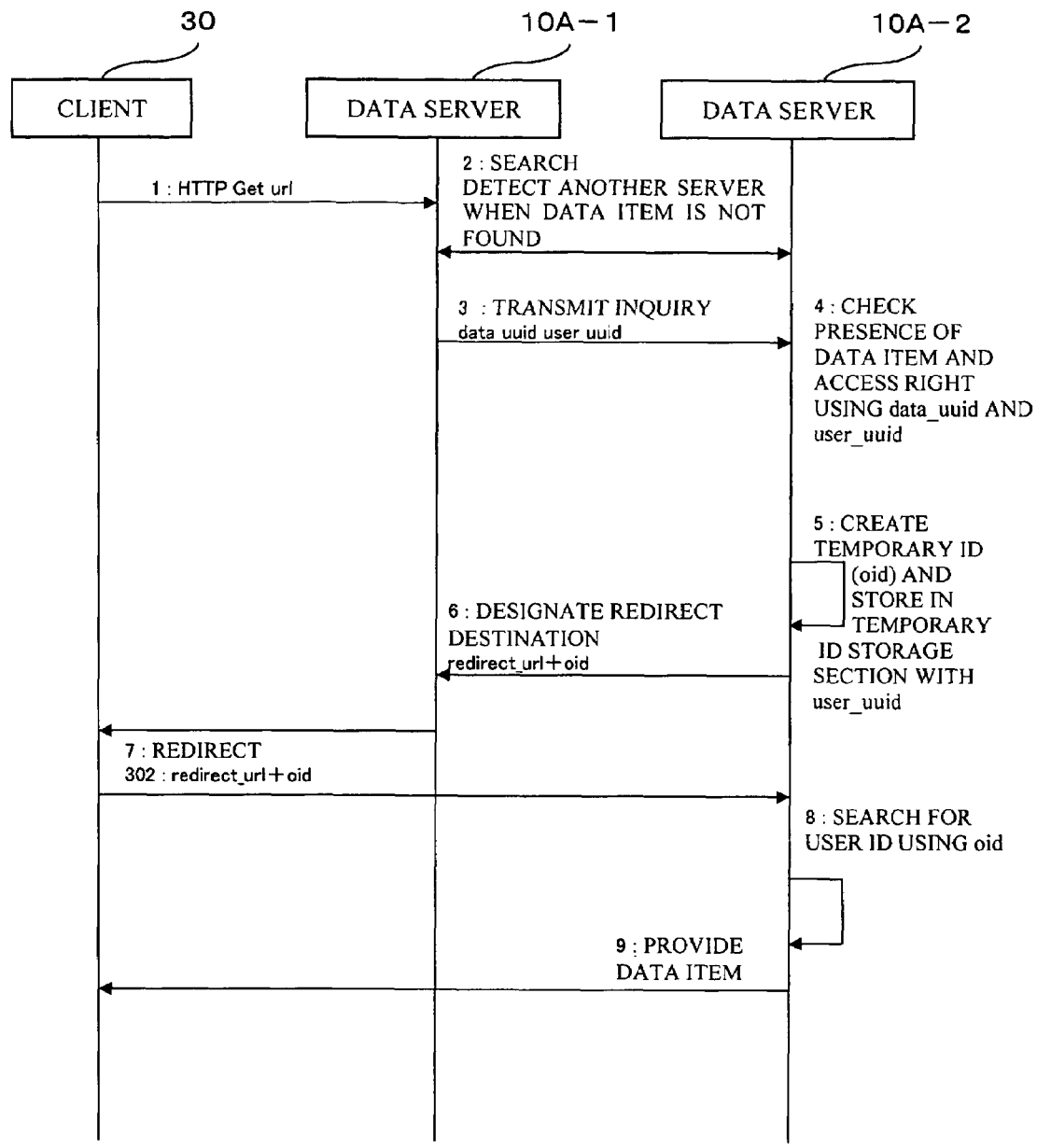
FIG. 13 is a diagram showing a flow of processing in a data management system.

As shown in FIG. 13, in the embodiment, (1) the data server 10A-1 receives, from a client 30, a data request corresponding to a URL as shown in FIG. 3 which designates the UUID of a data item. It is assumed that user authentication is successfully completed before the request is transmitted and the user has logged in.

(2) The data server 10A-1 searches its data management section 12 for the data item having the UUID, and, when the data server 10A-1 cannot find the data item, the data server 10A-1 detects another data server 10A-2 on the network 20 by means of the detection section 14.

(3) When another data server 10A-2 is found, the inquiry section 16 of the data server 10A-1 transmits to the server 10A-2 a data inquiry including the UUID of the requested data item (data_uuid), the UUID of the requesting user (user_uuid), and the operation content requested by the user on the data item. The operation content is, for example, reading of the data item, writing of the data item, etc., and the user instructs the data server 10A-1 of the operation.

(4) The inquiry section 16 of the data server 10A-2 receiving the inquiry searches its own data management section 12 for the data item which is the requested data item (data ID=data_uuid), and, when the data item is found, checks the access right of the user requesting the data item (user ID=user_uuid) by means of the access right management section 44. Regarding the access right of the requesting user with respect to the requested data item, the data server determines that the user has the access right if the access right necessary for the operation requested by the user is stored in the access right management section 44. In the following description, it is assumed that the data server 10A-2 has the requested date item and determines that the requesting user has the access right for the data operation.

(5) In this case, the inquiry section 16 of the data server 10A-2 creates a temporary ID (oid) and stores the temporary ID (oid) in the temporary ID storage section 46 in correspondence to the user ID of the requesting user (user_uuid). As the temporary ID, the inquiry section 16 creates an ID which is unique at least within the data server 10A-2. In this process, a time obtained by adding a predetermined valid period (for example, a few minutes) to the current time is stored in the temporary ID storage section 46 as the expiration time 246.

(6) The inquiry section 16 of the data server 10A-2 returns to the inquiring data server 10A-1 redirect information including a virtual URL of the requested data item in the data management section 12 (redirect_url) and the created temporary ID (oid). The URL of the requested data item is, for example, a virtual URL including the server ID of the data server 10A-2 and the data identifier of the requested data item. The temporary ID (oid) may be described, for example, in the query section of the URL.

(7) The data server 10A-1 returns to the client 30 redirect information including a status code indicating redirect such as 302 (Temporarily Moved) and a location field including the URL of the redirect destination (redirect_url) and the temporary ID (oid). The client 30 receiving the redirect information transmits a data request including the data identifier in the redirect information to the data server 10A-2 indicated by the server ID in the redirect information according to HTTP. In this process, the temporary ID (oid) is also transmitted to the data server 10A-2.

(8) The data server 10A-2 searches the temporary ID storage section 46 for the temporary ID (oid) included in the data request, and, when the temporary ID is found, the data server 10A-2 checks whether or not the expiration time of the temporary ID has been reached. When the temporary ID is found and the expiration time has not been reached, the temporary ID is valid. In this case, the data server 10A-2 determines the user ID (user_uuid) corresponding to the temporary ID (oid) from the temporary ID storage section 46. The data server 10A-2 sends the user ID to the login processor section 40 to perform the login process. The login processor section 40 performs the login process for the user ID and recognizes that the data request is from that user ID. Specifically, when the temporary ID included in the data request is valid, the login processor section 40 allows the user to log in while assuming that the user authentication is successful, without going through the normal user authentication process in which the user is prompted to input authentication information such as the password.

(9) The data server 10A-2 retrieves the requested data item from the data management section 12 and provides the requested data item to the client 30. When the login process based on the temporary ID is completed, the data server 10A-2 deletes the record regarding the temporary ID from the temporary ID storage section 46. Alternatively, the data server 10A-2 may also be configured so that information indicating that the temporary ID is invalid is stored in the temporary ID storage section 46 instead of deleting the record.

Processing performed by the overall system has been described. The processing will now be described from the viewpoint of each data server 10A.

By reference to FIGS. 14 and 15, processing of the data server 10A when receiving a data request from a client will be described.

The data request is assumed to require user authentication (that is, an access limitation is imposed on the data item for a request). For requests regarding data items having no access limitation (that is, data items available to a guest), no determination is made as to whether or not user authentication is successful.

Figure 14:
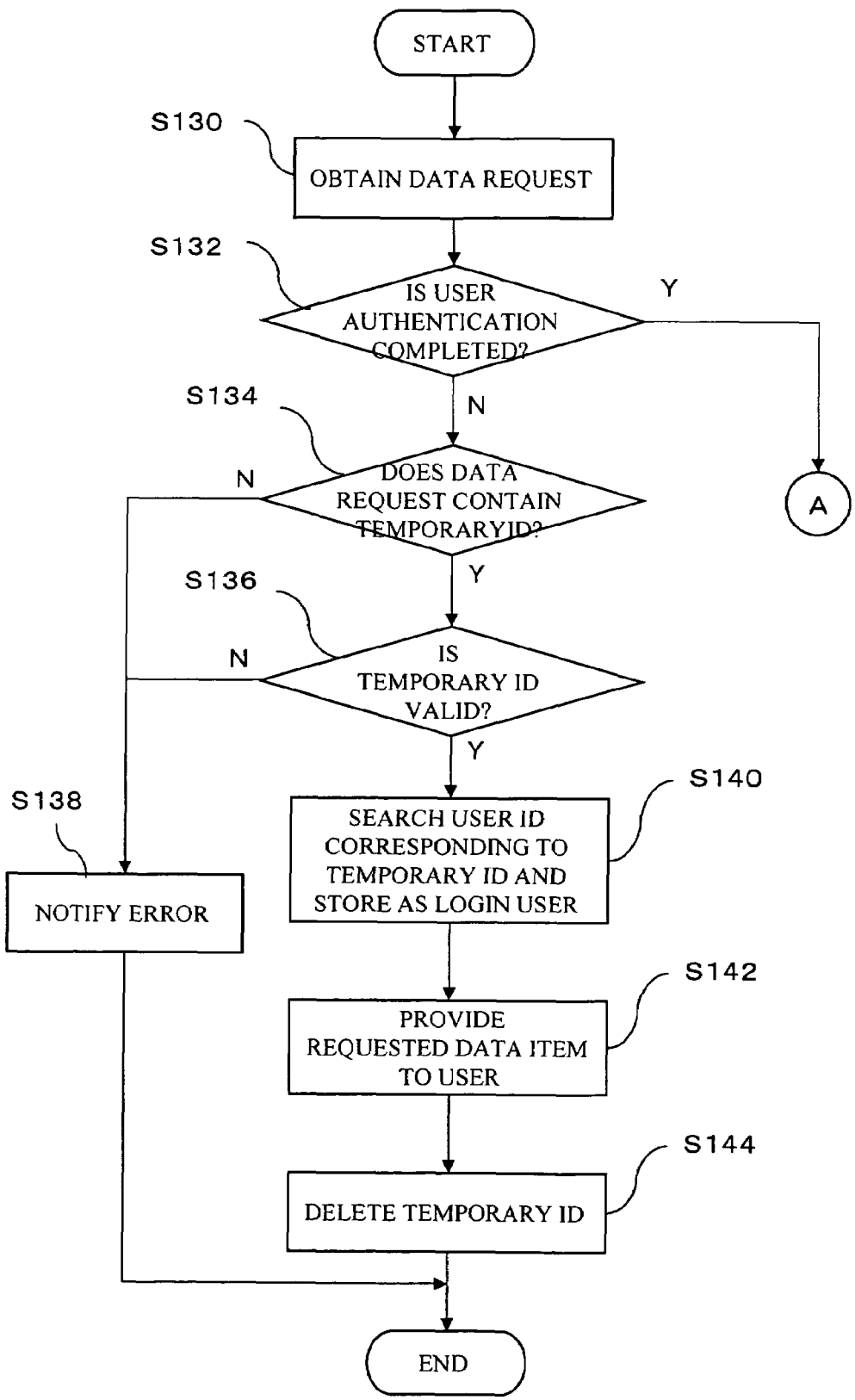
FIG. 14 is a flowchart showing a portion of processing of a data server when receiving data request information from a client.

The process begins with the steps shown in FIG. 14. Specifically, when the data server 10A receives a data request from a client 30 (S130), the data server 10A determines whether or not user authentication for the requesting user has been successfully completed (that is, whether or not the user has logged in) (S132).

When user authentication has not yet been successfully completed, the data server 10A checks whether or not the data request includes a temporary ID (S134). When the data request does not include the temporary ID, the data server 10A determines that the data request constitutes unauthorized access and performs a process such as notifying the client 30 of an error (S138).

When the data request includes a temporary ID, the data server 10A determines whether or not the temporary ID is valid, by means of the temporary ID storage section 46 (S136). The temporary ID is determined to be valid when the temporary ID is included in the temporary ID storage section 46 and the expiration time has not yet been reached. Otherwise, the temporary ID is determined to be invalid. When the temporary ID is determined to be invalid, the data server 10A determines that the data request constitutes unauthorized access and performs a process such as notifying the client 30 of an error (S138).

When the temporary ID is determined to be valid, the data server 10A reads, from the temporary ID storage section 46, the user ID corresponding to the temporary ID, determines the user ID to indicate a login user, and instructs the login processor section 40 to perform the login process (S140). The data server 10A retrieves the requested date item from the data management section 12 and provides the requested data item to the client 30 (S142). The data server 10A also deletes the temporary ID from the temporary ID storage section 46 or invalidates the temporary ID (S144). The deletion or invalidation of the temporary ID is executed after completion of the login process based on the temporary ID, and may be performed, for example, before the provision of the data item to the client 30. During the course of data provision, the data server 10A may attach an attribute of access limitation to the data item to be provided according to the access right granted to the user. Alternatively, the data server 10A may record the user ID determined from the temporary ID to be the ID of a user who has instructed a process when the data server 10A performs a process such as providing a data item.

The process illustrated in FIG. 14 described above is a process for a redirected data request. When, on the other hand, it is determined in step S132 that user has been authenticated, the data request is, in general, a data request which is not redirected. Therefore, the process performed in this case is similar to the process illustrated in FIG. 4. A process performed when the user authentication is confirmed in step S132 is illustrated in FIG. 15. The processing illustrated in FIG. 15 is identical with the processing illustrated in FIG. 4 except for steps S108a and S112a, and, therefore, steps similar to those in FIG. 4 are assigned the same reference numerals and will not be described in detail.

Figure 15:
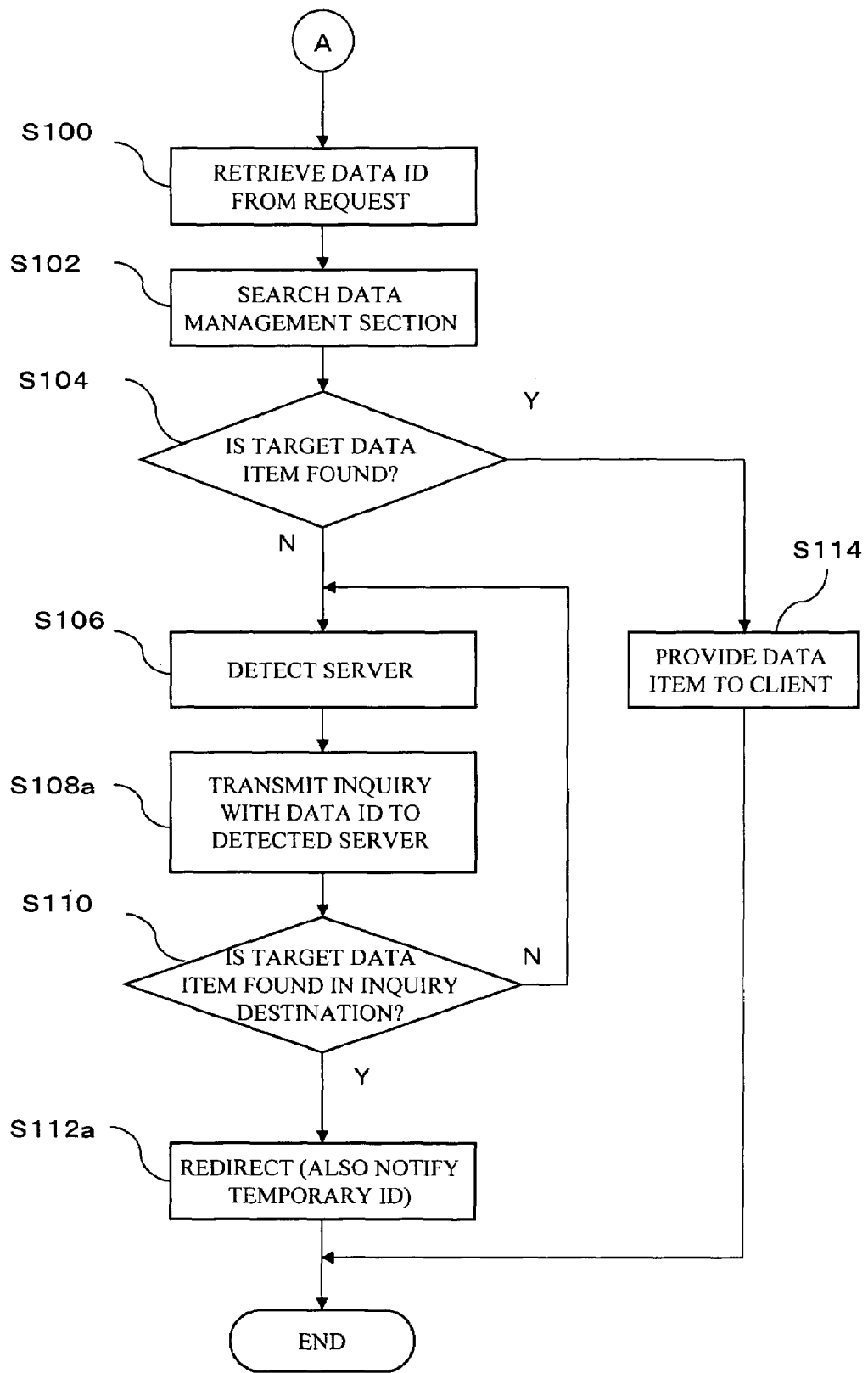
FIG. 15 is a flowchart showing a remaining portion of processing of a data server when receiving data request information from a client.

In the processing illustrated in FIG. 15, when the data server 10A does not have the requested data item, the data server 10A transmits, to the detected data server, the user ID and the information of the operation in relation to the requested data item, in addition to the data ID, in order to inquire the presence of the requested data item and status of access right of the user for the requested data item (S108a). When the data server 10A receives, from the inquiry destination data server, a response to the inquiry indicating that the requested data item is not present, processing returns to step S106 and the data server 10A transmits a similar inquiry to another data server. Although not shown in the drawings, the system may be configured so that, when the response from the inquiry destination data server indicates that the requested data item is present, but the requesting user does not have the access right for the data item, a notification to this effect is sent to the client 30. In this case, because the data server 10A can be notified that the data item is at the inquiry destination, the data server 10A does not need to transmit a further inquiry to other data servers.

When the inquiry destination has the requested data item and the user has the access right, a response including a temporary ID is returned. The data server 10A creates redirect information including the temporary ID and the virtual URL of the requested data item at the inquiry destination and returns the redirect information to the client 30 (S112a).

Figure 16:
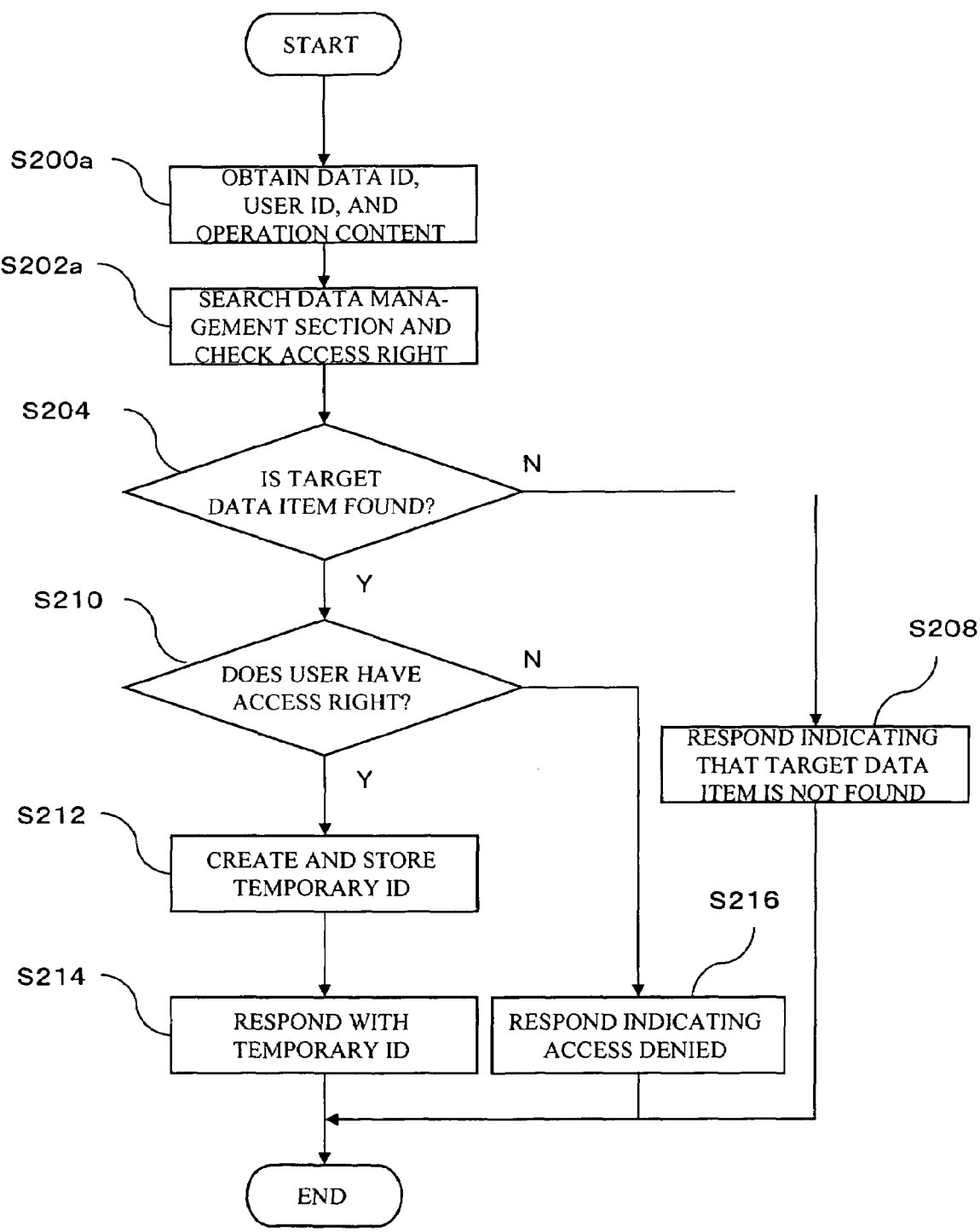
FIG. 16 is a flowchart showing processing of a data server when receiving an inquiry from another data server.

Next, by reference to FIG. 16, there will be described processing performed by the data server 10A when the data server 10A receives, from another data server, an inquiry as to whether or not the data server 10A has the requested data item. In FIG. 16, steps of processes similar to those in FIG. 5 are assigned the same reference numerals and will not be described again.

In this process, when the data server 10A receives an inquiry from another data server, the data server 10A obtains the data ID, the user ID, and the information on the operation content included in the inquiry (S200a). Then, the data server 10A searches the data management section 12 for the data item corresponding to the data ID and checks the access right of the user with respect to the data ID by referring to the access right management section 44 (S202*a*). When the data item corresponding to the data ID is found and it is determined that the user has the access right corresponding to the operation content (when the determination result in step S210 is YES (Y)), the data server 10A creates a new temporary ID which does not coincide with existing temporary IDs (S212) and transmits a response including the temporary ID to the inquiring data server 10A (S214). When the requested data item is present in the data management section 12 but the user does not have the access right corresponding to the operation content (when the determination result in step S210 is NO (N)), the data server 10A transmits a response to the inquiring data server indicating that the data server 10A has the requested data item, but the requested data item cannot be accessed (S216).

As described, in the present embodiment, the data server 10A-2 which has received the inquiry on the presence of the requested data item from the inquiring data server 10A-1 issues the temporary ID when the data server 10A-2 finds the requested data item in the data management section 12 and determines that the requested data item can be provided to the requesting user. The inquiring data server 10A-1 returns to the client 30 the redirect information including the temporary ID. When the data server 10A-2 receives the redirect of the data request and detects a valid temporary ID from the request, the data server 10A-2 processes the request as a request from a valid, authenticated user. In this manner, the user does not need to execute the user authentication process with respect to the redirect destination data server 10A-2. Thus, according to the present embodiment, because the individual data server 10A issues a temporary ID and the temporary ID is transmitted to and used by the requesting client, the central server for managing the login states of the users as required in the related art does not need to be provided. Therefore, although the related art involves significant influences of failure of the server managing the login states, in the system according to the present embodiment, influences of the failure of the data server 10A are limited to a relatively narrow range.

The above-described embodiment is exemplary, and various modifications can be made within the scope of the present invention. For example, although in the above-described embodiment the data server 10A-2 which is the inquiry destination (redirect destination) creates a temporary ID, the system can also be configured so that the inquiring data server 10A-1 creates the temporary ID and provides the temporary ID to the redirect destination data server 10A-2. The processing of this alternative embodiment will now be described by reference to FIG. 17.

Figure 17:
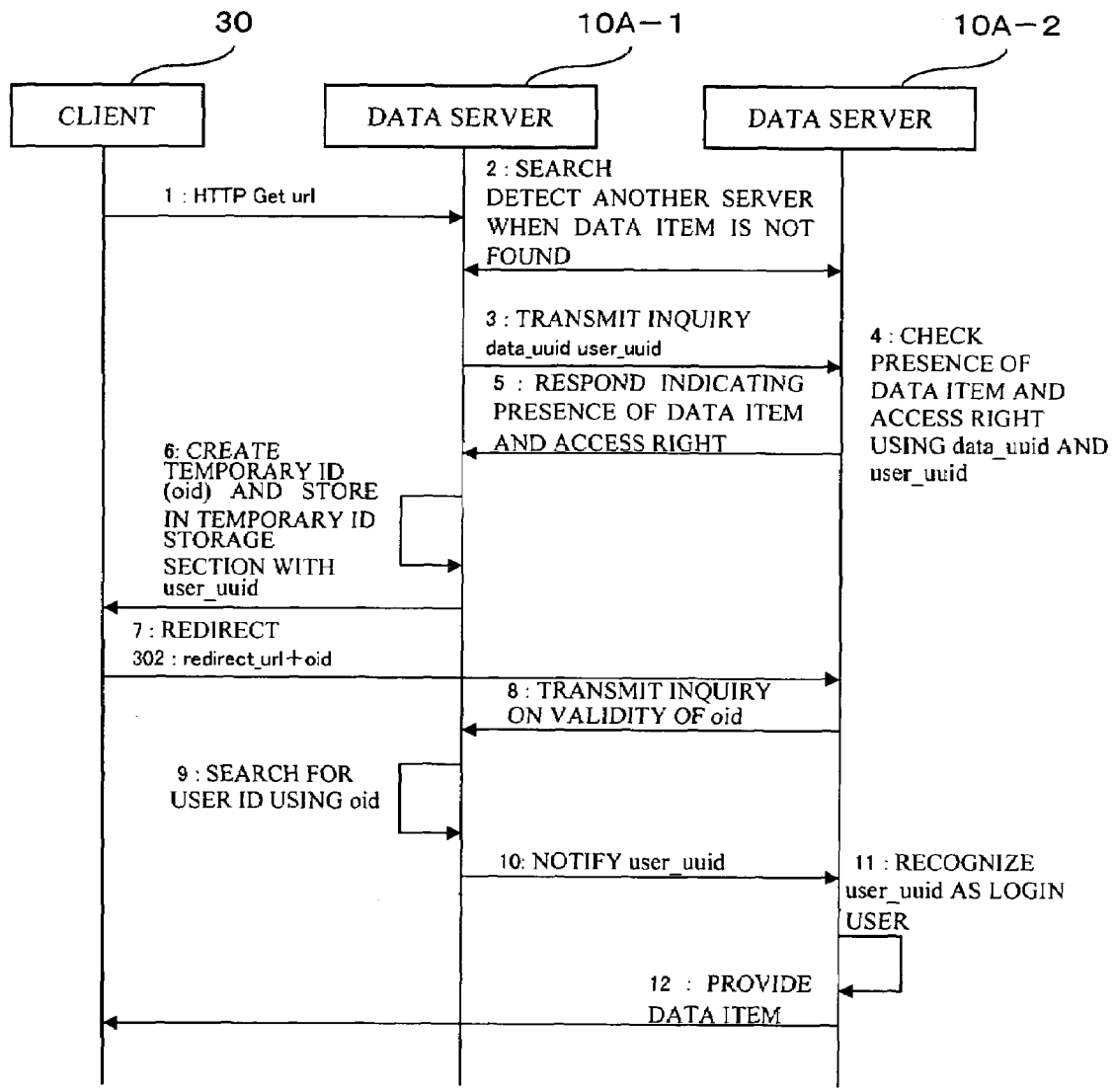
FIG. 17 is a diagram showing a flow of processing in an alternative embodiment.

In the procedure illustrated in FIG. 17, (1) the data server 10A-1 receives a data request from the logged-in user.

(2) The data server 10A-1 searches the data management section 12 for the requested data item, and, when the requested data item is not found, detects another data server 10A-2 on the network 20 by means of the detection section 14.

(3) When another data server 10A-2 is found, the inquiry section 16 of the data server 10A-1 transmits to the server 10A-2 a data inquiry including the UUID of the requested data item (data_uuid), the UUID of the requesting user (user_uuid), and operation content requested by the user on the data item.

(4) The inquiry section 16 of the data server 10A-2 searches the data management section 12 for the requested data item (data ID=data_uuid), and, when the requested data item is found, the data server 10A-2 checks the access right of the requesting user (user ID=user_uuid) in relation to the requested data item, by means of the access right management section 44. When the access right corresponding to the operation requested by the user is found in the access right management section 44 as the access right of the requesting user in relation to the requested data item, the data server 10A-2 determines that the user has the access right. In this description, it is assumed that the data server 10A-2 has the requested data item and the requesting user has the access right in relation to the requested data item.

(5) In this case, the inquiry section 16 of the data server 10A-2 transmits a response to the inquiring data server 10A-1 indicating that the requested data item is present and the user has the access right.

When the data server 10A-2 does not have the requested data item or when the data server 10A-2 has the requested data item but the user does not have the access right, the data server 10A-2 transmits a response to the data server 10A-1 indicating this situation.

(6) When the data server 10A-1 receives this response, the data server 10A-1 creates a temporary ID (oid) and stores the temporary ID (oid) in the temporary ID storage section 46 in correspondence with the user ID of the requesting user (user_uuid). In this process, a time obtained by adding a predetermined valid period (for example, a few minutes) to the current time is stored in the temporary ID storage section 46 as the expiration time 246.

(7) The data server 10A-1 creates redirect information including the virtual URL of the requested data item in the data server 10A-2 (redirect_url), the created temporary ID (oid), and the server ID of the data server 10A-1 (for example, the IP address) and returns the redirect information to the client 30. When the client 30 receives the redirect information, the client 30 transmits a data request including the data ID, the temporary ID, and the server ID (of the data server 10A-1) in the redirect information to the data server 10A-2 indicated by the server ID within the redirect information according to HTTP.

(8) The data server 10A-2 transmits an inquiry to the data server 10A-1 indicated by the server ID in the data request as to the validity of the temporary ID (oid) included in the data request.

(9) When the data server 10A-1 receives the inquiry, the data server 10A-1 searches the temporary ID storage section 46 for the temporary ID (oid) in the inquiry, and, when the temporary ID is found, the data server 10A-1 checks whether or not the expiration time has been reached. When the temporary ID storage section 46 has the temporary ID and the expiration time has not been reached, the temporary ID is valid.

(10) When the data server 10A-1 determines that the temporary ID is valid, the data server 10A-1 determines, by means of the temporary ID storage section 46, the user ID (user_uuid) corresponding to the temporary ID and returns the user ID to the data server 10A-2. After the data server 10A-1 provides the data server 10A-2 with the user ID corresponding to the temporary ID, the data server 10A-1 deletes the record related to the temporary ID from the temporary ID storage section 46.

When the temporary ID in the inquiry is not found in the temporary ID storage section 46 or when the temporary ID in the inquiry is found but the expiration time has already been reached, the data server 10A-1 transmits a response to the data server 10A-2 indicating that the temporary ID is invalid. When the data server 10A-2 receives this response, the data server 10A-2 performs an error process such as notifying the client 30 that the data item cannot be obtained.

(11) When the data server 10A-2 receives the user ID, the data server 10A-2 sends the user ID to the login processor section 40 to execute the login process. The login processor section 40 executes the login process for the user ID and recognizes that the data request originated from the user ID.

(12) The data server 10A-2 retrieves the requested data item from the data management section 12 and provides the data item to the client 30.

In this alternative embodiment also, the user authentication result can be transferred among multiple data servers without provision of a server which manages the login states of the users.

In the alternative embodiment shown in FIG. 17, when the data server 10A-2 receives the redirected data request, the data server 10A-2 transmits an inquiry to the redirecting data server 10A-1 regarding the validity of the temporary ID and the user ID corresponding to the temporary ID. Alternatively, the following configuration may be employed. In this configuration, when the data server 10A-1 creates the temporary ID, the data server 10A-1 transmits a pair constituted of the temporary ID and the user ID of the requesting user to the data server 10A-2 which is the redirect destination and the data server 10A-2 stores the pair in its temporary ID storage section 46. In this process, the data server 10A-2 receiving the redirected data request determines the validity of the temporary ID in the data request by referring to its own temporary ID storage section 46.

In the above-described embodiments, a UUID which is globally unique is used as the user ID, but the present invention is not limited to such a configuration. For example, it is also possible to employ a configuration in which user management by the data management system is performed by use of an LDAP (Lightweight Directory Access Protocol) server and a DN (Distinguished Name) of each user managed by the LDAP server is used as the user ID.

Figure 18:
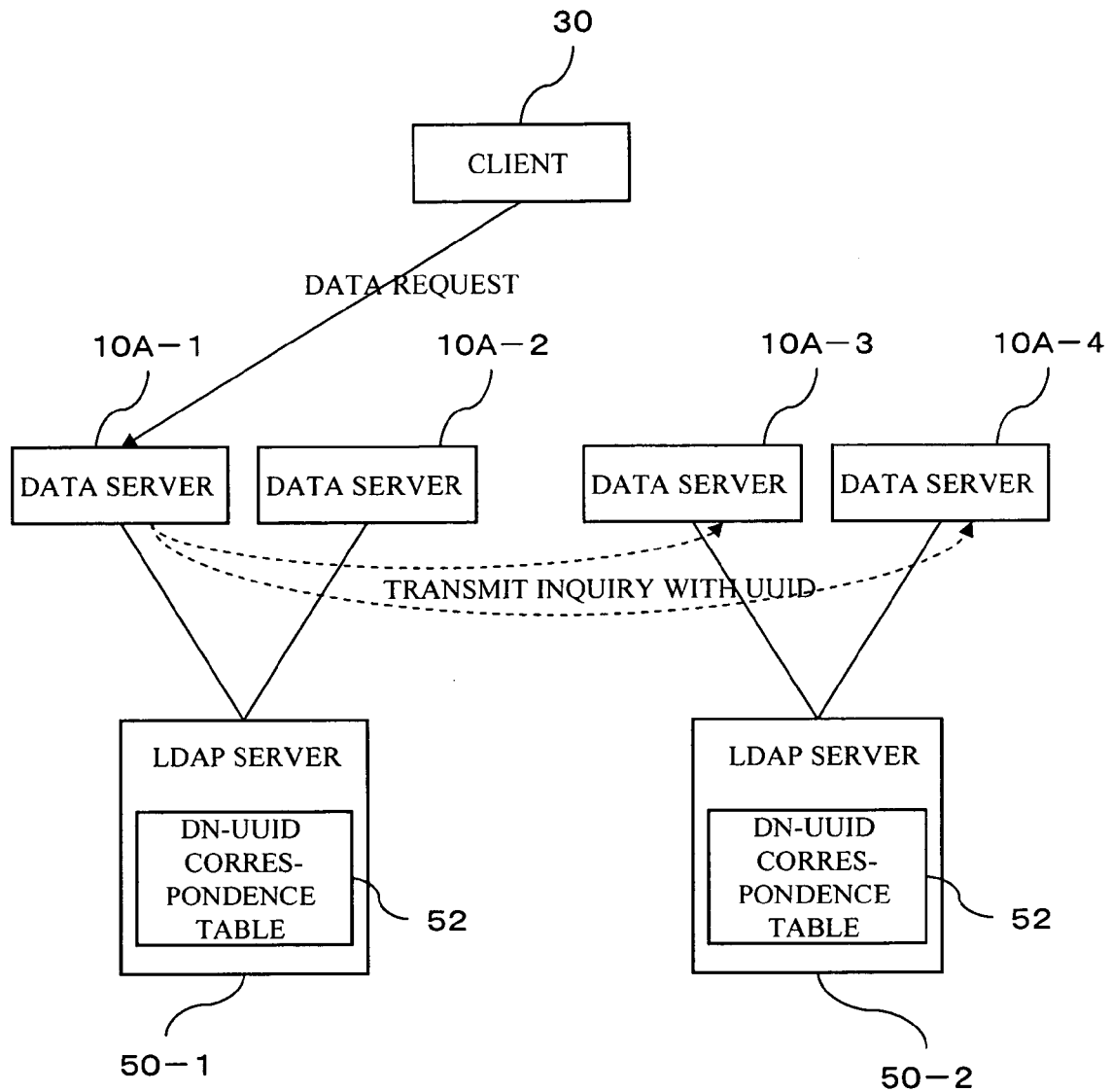
FIG. 18 is a diagram for explaining an alternative embodiment when user management is performed using multiple LDAP servers.

In a system configuration in which different LDAP servers 50-1 and 50-2 individually manage registered users of a collection of different data servers 10A as shown in FIG. 18, each LDAP server 50-1 or 50-2 desirably has a correspondence table 52 showing correspondence between the DNs and UUIDs of the users. In this configuration, when a user who is authenticated in the DN transmits a data request to the data server 10A-1 which is managed by the LDAP server 50-1 and the data server 10A-1 transmits an inquiry to other data servers 10A-2, 10A-3, and 10A-4 for the target data of the request, the data server 10A-1 obtains the UUID corresponding to the DN and transmits an inquiry using the UUID. The inquired data server 10A-2, 10A-3, or 10A-4 obtains the DN corresponding to the UUID from the LDAP server 50-1 or 50-2 to identify the requesting user.

Alternatively, it is also possible to employ a configuration in which each data server 10A has mapping information of the user ID instead of using the UUID and LDAP. The mapping information is, for example, a table to which a correspondence between the user ID of each registered user and the data servers (servers A, B, and C) is stored, as shown in FIG. 19. The column showing "-" indicates that the user is not registered in that data server. By virtue of having such mapping information, each data server 10A can identify, using the table, the registered user corresponding to the user ID included in the inquiry from another data server.

An alternative to the user ID has been described. A similar alternative configuration may be employed for the data ID.

The format of the access right management section 44 and the access right information managed by the access right management section 44 (FIG. 11) shown in the above-described embodiments are also exemplary. Various configurations are available for the access right management of data items, and any of the various methods may be used by the access right management section 44.

If a policy is adopted in which access by a registered user of any data server 10A which partially constitutes the system is to be permitted by another data server 10A in the system, the access right management itself can be omitted. In this configuration, a temporary ID can be issued when the inquiry destination data server 10A has the requested data item.

In the above description, the data server 10A unconditionally trusts another data server 10A detected by means of the detection section 14 and transmits information such as the user ID. In order to achieve a more secure system, the following configuration may be employed.

In one exemplary method, each data server 10A has a list of data servers that the data server 10A trusts and inquiry is transmitted only to the data servers on that list. The administrator of the data server can register other trusted data servers in the list.

In an alternative configuration, when the data server receiving the inquiry does not have the requested data item, the data server may return the list of data servers that the data server trusts, instead of simply transmitting a response indicating that the data server does not have the requested data item. In this manner, the inquiring data server can merge the received list with the existing list to thereby expand the list. This method can be used when a policy is adopted in which a data server trusted by a trusted data server is to be trusted.

Alternatively, it is also possible to employ a configuration in which there is adopted a rule of trusting a data server which refers to the same LDAP server, instead of using the list. Moreover, it is also possible to employ a configuration in which the data server receives a digital certificate from another data server and, on the basis of the digital certificate, determines whether or not the other data server is to be trusted (for example, the other data server is to be trusted if the digital certificate is issued by a trusted authority).

The data servers 10A of the embodiments described above are typically realized by executing on a computer a program describing all functions of the elements described above. The program can be provided to a user in a form recorded on a computer-readable recording medium such as a CD-ROM, DVD-ROM, flexible disk, or hard disk drive. The program may be downloaded from a server through a data communication network to the user's computer.

According to an aspect of the present invention, there is provided a data server which partially constitutes a data management system in cooperation with another data server connected via a network, the data server having: a data management section that stores a data item; a user authentication section that performs user authentication; a searching section that searches the data management section for a requested data item when a data request is received from a client; a data providing section that provides the requested data item to the client when the requested data item is found in the data management section; and a redirect section that, when the requested data item is not found in the data management section, detects a data server which stores the requested data item in the data management system, receives temporary authentication information from the data server, and sends information to identify the requested data item in the data server and the temporary authentication information to the client.

According to another aspect of the present invention, there is provided a data server which partially constitutes a data management system in cooperation with another data server connected via a network, the data server having: a user authentication section that performs user authentication; a searching section that searches the data management section for a requested data item when a data request is received from a client; a data providing section that provides the requested data item to the client when requested data item is found in the data management section; and an inquiry responding section that searches the data management section when receiving an inquiry on presence of a requested data item from other data server in the data management system, and, when the requested data item is found, creates temporary authentication information, stores the temporary authentication information in a temporary authentication information storage section, and notifies the other data server of the temporary authentication information.

According to another aspect of the present invention, the data server may further include a redirect authentication section that, when a data request is received from a client for which user authentication has not been completed, accepts the data request without causing the client to perform a process for user authentication when the redirect authentication section determines that the data request includes the temporary authentication information which is stored in the temporary authentication storage section.

According to another aspect of the present invention, the data server may further include a user information receiving section that receives, from the other data server, user identification information of a data-requesting user; and a user information storage section that stores the user identification information received from the other data server in the temporary authentication information storage section in correspondence to temporary authentication information; wherein the redirect authentication section identifies, when the data request from the client includes temporary authentication information stored in the temporary authentication information storage section, user identification information corresponding to the stored temporary authentication information, and determines that the data request is from the client corresponding to the user identification information.

According to another aspect of the present invention, the inquiry responding section may check, when the requested data item is found in the data management section in response to the inquiry on presence of the requested data item from the other data server, an access right of the user in relation to the requested data item, and notify the other data server of the temporary authentication information when the user is determined to have the access right.

According to another aspect of the present invention, there is provided a first data server which partially constitutes a data management system in cooperation with another data server connected via a network, the first data server having: a data management section that stores a data item; a user authentication section that performs user authentication; a searching section that searches the data management section for a requested data item when a data request is received from a user; a data providing section that provides the requested data item to the client when the requested data item is found in the data management section; and a redirect section that, when the requested data item is not found in the data management section, detects a second data server which stores the requested data item in the data management system, generates temporary authentication information for the requested data item, generates redirect information including information to identify the requested data item in the second data server, the temporary authentication information for the requested data item, and server identification information of the first data server, and returns the redirect information to the client.

According to another aspect of the present invention, there is provided a second data server which partially constitutes a data management system in cooperation with another data server connected via a network, the second data server having: a data management section that stores a data item; a user authentication section that performs user authentication; a searching section that searches the data management section for a requested data item when a data request is received from a user; a data providing section that provides the requested data item to the client when the requested data item is found in the data management section; a redirect authentication section that, when a data request is received from a client for which the user authentication has not been completed, transmits an inquiry on validity of temporary authentication information retrieved from the data request to a first data server indicated by server identification information retrieved from the data request, and accepts the data request without causing the client to perform a process for user authentication when a response to the inquiry indicating that the temporary authentication information is valid is received.

According to another aspect of the present invention, the first data server may further include: a temporary authentication information storage section that stores the generated temporary authentication information in correspondence to user identification information of the data-requesting user; and a responding section that provides, to the second data server, when an inquiry on validity of temporary authentication information is received from the second data server and the temporary authentication information storage section stores the temporary authentication information, information indicating that the temporary authentication information is valid.

According to another aspect of the present invention, the second data server may further include: a user information receiving section that receives user identification information of a user requesting the data item from the first data server when receiving an inquiry on presence of the requested data item from the first data server; and an inquiry responding section that checks, when the requested data item is found in the data management section in response to an inquiry on presence of the requested data item from the first data server, an access right of the user in relation to the requested data item, and notifies the first data server that the requested data item can be provided when the user is determined to have the access right.

According to another aspect of the present invention, the second data server may further include: an authentication information receiving section that receives temporary authentication information from the first data server; a temporary authentication information storage section that stores the temporary authentication information received from the first data server; and a redirect authentication section that determines, when a data request is received from a client for which the user authentication has not been completed, whether or not the data request includes temporary authentication information stored in the temporary authentication information storage section, and accepts the data request without causing the client to perform a process for user authentication when the redirect authentication section determines that the data request includes the temporary authentication information.

According to another aspect of the present invention, there is provided a data management method executed by a data server which partially constitutes a data management system in cooperation with another data server connected via a network, the method having: searching the data server for a requested data item in a data request when the data request is received from a client which is successfully authenticated;

providing the requested data item when the requested data item is found; identifying a data server having the requested data item as a transfer destination server by transmitting an inquiry on presence of the requested data item to another data server when the requested data item is not found; receiving temporary authentication information from the transfer destination server; and returning to the client redirect information including access information which identifies the requested data item in the transfer destination server and the temporary authentication information.

According to another aspect of the present invention, there is provided a data management method executed by a data server which partially constitutes a data management system in cooperation with another data server connected via a network, the method having: searching the data server for a requested data item of a data request when the data request is received from a user who is successfully authenticated; providing the requested data item to the client when the requested data item is found; identifying a data server having the requested data item as a transfer destination server by transmitting an inquiry on presence of the requested data item to another data server when the requested data item is not found; creating temporary authentication information for the requested data item; and creating redirect information including access information for identifying the requested data item in the transfer destination server, the temporary authentication information for the requested data item, and server identification information of the data server, and returning the redirect information to the client.

According to another aspect of the present invention, redirect authentication section may determine that the data request is from a client corresponding to the user identification information when the user identification information is received in relation to the inquiry on the validity of the temporary authentication information.

According to another aspect of the present invention, there is provided a data management system having: a data management section that stores a data item; a user authentication section that performs user authentication; a searching section that searches the data management section for a requested data item when a data request is received from a client; a data providing section that provides the requested data item to the client when the requested data item is found in the data management section; a redirect section that, when the requested data item is not found in the data management section, detects a data server which stores the requested data item in the data management system, receives temporary authentication information from the data server, and sends information to identify the requested data item in the data server and the temporary authentication information to the client; and an inquiry responding section that searches the data management section when receiving an inquiry on presence of a requested data item from other data server in the data management system, and, when the requested data item is found, creates temporary authentication information, stores the temporary authentication information in a temporary authentication information storage section, and notifies the other data server of the temporary authentication information.

According to another aspect of the present invention, the data management system may further include: a redirect authentication section that, when a data request is received from a client for which user authentication has not been completed, determines whether or not the data request includes temporary authentication information which is stored in the temporary authentication storage section, and accepts the data request without causing the client to perform a process for user authentication when the redirect authentication section determines that the data request includes the temporary authentication information.

According to another aspect of the present invention, the data management system may further include: a user information receiving section that receives, from the other data server, user identification information of a data-requesting user; and a user information storage section that stores the user identification information received from the other data server in the temporary authentication information storage section in correspondence to temporary authentication information; wherein the redirect authentication section identifies, when the data request from the client includes temporary authentication information stored in the temporary authentication information storage section, user identification information corresponding to the stored temporary authentication information, and determines that the data request is from the client corresponding to the user identification information.

According to another aspect of the present invention, the inquiry responding section may check, when the requested data item is found in the data management section in response to the inquiry on presence of the requested data item from the other data server, an access right of the user in relation to the requested data item, and notify the other data server of the temporary authentication information when the user is determined to have the access right.

Although a preferred form of the present invention has been described in its preferred form with a certain degree of particularity using specific examples, it is to be understood that the invention is not limited thereto. Further, it is understood by those skilled in the art that various changes and modifications may be made in the invention without departing from the sprit and scope thereof.

What is claimed is:

1. A data server which partially constitutes a data management system in cooperation with another data server connected via a network, the data server comprising:
    a data management section to store a data item;
    a user authentication section that performs user authentication;
    a searching section that searches the data management section for a data item requested by a client when a data request is received from a the client;
    a data providing section to provide the data item requested by the client to the client when the requested data item is found in the data management section;
    a redirect section that, when the data item requested by the client is not found in the data management section, detects a data server which stores the data item requested by the client in the data management system, receives temporary authentication information from the data server, and sends information to identify the data item requested by the client in the data server and the temporary authentication information to the client;
    a redirect authentication section that, when a data request is received from a client for which user authentication has not been completed, accents the data request without causing the client to perform a process for user authentication when the redirect authentication section determines that the data request includes the temporary authentication information which is stored in the temporary authentication storage section;
    a user information receiving section that receives, from the other data server, user identification information of a data-requesting user; and
a user information storage section that stores the user identification information received from the other data server in the temporary authentication information storage section in correspondence to temporary authentication information; and wherein the redirect authentication section identifies, when the data request from the client includes temporary authentication information stored in the temporary authentication information storage section, user identification information corresponding to the stored temporary authentication information, and determines that the data request is from the client corresponding to the user identification information.

2. A data server which partially constitutes a data management system in cooperation with another data server connected via a network, the data server comprising:

a user authentication section that performs user authentication;

a searching section that searches the data management section for a data item requested by a client when a data request is received from the client;

a data providing section to provide the data item requested by the client to the client when the requested data item is found in the data management section; an inquiry responding section that searches the data management section when receiving an inquiry on presence of a data item requested by the client from other data server in the data management system, and, when the data item requested by the client is found, creates temporary authentication information, stores the temporary authentication information in a temporary authentication information storage section, and notifies the other data server of the temporary authentication information a redirect authentication section that, when a data request is received from a client for which user authentication has not been completed, accepts the data request without causing the client to perform a process for user authentication when the redirect authentication section determines that the data request includes the temporary authentication information which is stored in the temporary authentication storage section;

a user information receiving section that receives, from the other data server, user identification information of a data-requesting user; and a user information storage section that stores the user identification information received from the other data server in the temporary authentication information storage section in correspondence to temporary authentication information; and wherein the redirect authentication section identifies, when the data request from the client includes temporary authentication information stored in the temporary authentication information storage section, user identification information corresponding to the stored temporary authentication information, and determines that the data request is from the client corresponding to the user identification information.

3. The data server according to claim 2, wherein the inquiry responding section cheeks, when the requested data item is found in the data management section in response to the inquiry on presence of the data item requested by the client from the other data server, an access right of the user in relation to the data item requested by the client, and notifies the other data server of the temporary authentication information when the user is determined to have the access right.

4. A first data server which partially constitutes a data management system in cooperation with another data server connected via a network, the first data server comprising:

a data management section to store a data item;
a user authentication section that performs user authentication;

a searching section that searches the data management section for a data item requested by a user when a data request is received from a the user;

a data providing section that provides the data item requested by the user to the client user when the data item requested by the user is found in the data management section;

a redirect section that, when the data item requested by the user is not found in the data management section, detects a second data server which stores the data item requested by the user in the data management system, generates temporary authentication information for the data item requested by the user, generates redirect information including information to identify the data item requested by the user in the second-data server, the temporary authentication information for the data item requested by the user, and server identification information of the first data server, and returns the redirect information to the client;

a redirect authentication section that, when a data request is received from a client for which user authentication has not been completed, accepts the data request without causing the client to perform a process for user authentication when the redirect authentication section determines that the data request includes the temporary authentication information which is stored in the temporary authentication storage section;

a user information receiving section that receives, from the other data server, user identification information of a data-requesting user; and a user information storage section that stores the user identification information received from the other data server in the temporary authentication information storage section in correspondence to temporary authentication information; and wherein the redirect authentication section identifies, when the data request from the client includes temporary authentication information stored in the temporary authentication information storage section, user identification information corresponding to the stored temporary authentication information, and determines that the data request is from the client corresponding to the user identification information.

5. The first second data server according to claim 4, further comprising:

a temporary authentication information storage section that stores the generated temporary authentication information in correspondence to user identification information of the data-requesting user; and a responding section that provides, to the second data server, when an inquiry on validity of temporary authentication information is received from the second data server and the temporary authentication information storage section stores the temporary authentication information, information indicating that the temporary authentication information is valid.

6. A second data server which partially constitutes a data management system in cooperation with another data server connected via a network, the second data server comprising:

a data management section to store a data item;
a user authentication section that performs user authentication;

a searching section that searches the data management section for a data item requested by a user when a data request is received from the user;

a data providing section that provides the data item requested by the user to the user when the data item requested by the user is found in the data management section;

a redirect authentication section that, when a data request is received from a user for which the user authentication has not been completed, transmits an inquiry on validity of temporary authentication information retrieved from the data request to a first data server indicated by server identification information retrieved from the data request, and accepts the data request without causing the user to perform a process for user authentication when a response to the inquiry indicating that the temporary authentication information is valid is received;

a user information receiving section that receives, from the other data server, user identification information of a data-requesting user; and a user information storage section that stores the user identification information received from the other data server in the temporary authentication information storage section in correspondence to temporary authentication information;

wherein the redirect authentication section identifies, when the data request from the client includes temporary authentication information stored in the temporary authentication information storage section, user identification information corresponding to the stored temporary authentication information, and determines that the data request is from the client corresponding to the user identification information.

7. The second data server according to claim 6, further comprising:

an inquiry responding section that checks, when the requested data item is found in the data management section in response to an inquiry on presence of the requested data item from the first data server, an access right of the user in relation to the requested data item, and notifies the first data server that the requested data item can be provided when the user is determined to have the access right;

said user information receiving section receiving user identification information of a user requesting the data item from the first data server when receiving an inquiry on presence of the requested data item from the first data server.

8. The second data server according to claim 6, further comprising:

an authentication information receiving section that receives temporary authentication information from the first data server; and a temporary authentication information storage section that stores the temporary authentication information received from the first data server;

said redirect authentication section determining, when a data request is received from a client for which the user authentication has not been completed, whether or not the data request includes temporary authentication information stored in the temporary authentication information storage section, and accepting the data request without causing the client to perform a process for user authentication when the redirect authentication section determines that the data request includes the temporary authentication information.

9. The second data server according to claim 6, wherein the redirect authentication section determines that the data request is from a client corresponding to the user identification information when the user identification information is received in relation to the inquiry on the validity of the temporary authentication information.

10. A data management method executed by a data server which partially constitutes a data management system in cooperation with another data server connected via a network, the method comprising:

searching the data server for a data item requested by a client in a data request when the data request is received from the client which is successfully authenticated;

providing the data item requested by the client when the data item requested by the client is found;

identifying a data server having the data item requested by the client as a transfer destination server by transmitting an inquiry on presence of the data item requested by the client to another data server when the data item requested by the client is not found;

receiving temporary authentication information from the transfer destination server;

returning to the client redirect information including access information which identifies the data item requested by the client in the transfer destination server and the temporary authentication information;

a redirect authentication section that, when a data request is received from a client for which user authentication has not been completed, accepts the data request without causing the client to perform a process for user authentication when the redirect authentication section determines that the data request includes the temporary authentication information which is stored in the temporary authentication storage section;

a user information receiving section that receives, from the other data server, user identification information of a data-requesting user; and a user information storage section that stores the user identification information received from the other data server in the temporary authentication information storage section in correspondence to temporary authentication information; and wherein the redirect authentication section identifies, when the data request from the client includes temporary authentication information stored in the temporary authentication information storage section, user identification information corresponding to the stored temporary authentication information, and determines that the data request is from the client corresponding to the user identification information.

11. A data management method executed by a data server which partially constitutes a data management system in cooperation with another data server connected via a network, the method comprising:

searching the data server for a data item requested by a user in a data request when the data request is received from the user who is successfully authenticated;

providing the data item requested by the user to the user client when the data item requested by the user is found;

identifying a data server having the data item requested by the user as a transfer destination server by transmitting an inquiry on presence of the data item requested by the user to another data server when the data item requested by the user is not found;

creating temporary authentication information for the data item requested by the user;

creating redirect information including access information for identifying the data item requested by the user in the transfer destination server, the temporary authentication information for the data item requested by the user, and server identification information of the data server, and returning the redirect information to the client;

a redirect authentication section that, when a data request is received from a client for which user authentication has not been completed, accents the data request without causing the client to perform a process for user authentication when the redirect authentication section determines that the data request includes the temporary authentication information which is stored in the temporary authentication storage section;

a user information receiving section that receives, from the other data server, user identification information of a data-requesting user; and a user information storage section that stores the user identification information received from the other data server in the temporary authentication information storage section in correspondence to temporary authentication information; and wherein the redirect authentication section identifies, when the data request from the client includes temporary authentication information stored in the temporary authentication information storage section, user identification information corresponding to the stored temporary authentication information, and determines that the data request is from the client corresponding to the user identification information.

12. A data management system comprising:

a data management section to store a data item;

a user authentication section that electronically performs user authentication;

a searching section that electronically searches the data management section for a data item requested by a client when a data request is received from a client;

a data providing section that provides the data item requested by the client to the client when the data item requested by the client is found in the data management section;

a redirect section that, when the data item requested by the client is not found in the data management section, electronically detects a data server which stores the data item requested by the client in the data management system, receives temporary authentication information from the data server, and sends information to identify the data item requested by the client in the data server and the temporary authentication information to the client;

an inquiry responding section that electronically searches the data management section when receiving an inquiry on presence of a data item requested by the client from other data server in the data management system, and, when the data item requested by the client is found, creates temporary authentication information, stores the temporary authentication information in a temporary authentication information storage section, and notifies the other data server of the temporary authentication information;

a redirect authentication section that, when a data request is received from a client for which user authentication has not been completed, determines whether or not the data request includes temporary authentication information which is stored in the temporary authentication storage section, and accents the data request without causing the client to perform a process for user authentication when the redirect authentication section determines that the data request includes the temporary authentication information;

a user information receiving section that receives, from the other data server, user identification information of a data-requesting user; and a user information storage section that stores the user identification information received from the other data server in the temporary authentication information storage section in correspondence to temporary authentication information;

wherein the redirect authentication section identifies, when the data request from the client includes temporary authentication information stored in the temporary authentication information storage section, user identification information corresponding to the stored temporary authentication information, and determines that the data request is from the client corresponding to the user identification information.

13. The data management system according to claim 12, wherein the inquiry responding section checks, when the requested data item is found in the data management section in response to the inquiry on presence of the requested data item from the other data server, an access right of the user in relation to the requested data item, and notifies the other data server of the temporary authentication information when the user is determined to have the access right.

* * * * *